(12) United States Patent
Gooneratne et al.

(10) Patent No.: US 11,506,047 B2
(45) Date of Patent: Nov. 22, 2022

(54) IMAGE BASED INSPECTION AND AUTOMATED INVENTORY AND SUPPLY CHAIN MANAGEMENT OF WELL EQUIPMENT

(71) Applicant: Saudi Arabian Oil Company, Dhahran (SA)

(72) Inventors: Chinthaka Pasan Gooneratne, Dhahran (SA); Michael Affleck, Aberdeen (GB); Timothy E. Moellendick, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 16/715,880

(22) Filed: Dec. 16, 2019

(65) Prior Publication Data
US 2020/0190963 A1     Jun. 18, 2020

Related U.S. Application Data

(60) Provisional application No. 62/780,833, filed on Dec. 17, 2018, provisional application No. 62/780,856, (Continued)

(51) Int. Cl.
*E21B 47/04* (2012.01)
*E21B 17/02* (2006.01)
(Continued)

(52) U.S. Cl.
CPC ............ *E21B 47/04* (2013.01); *E21B 17/02* (2013.01); *E21B 21/08* (2013.01); *E21B 41/00* (2013.01);
(Continued)

(58) Field of Classification Search
CPC .......... E21B 47/04; E21B 47/11; E21B 47/00; E21B 17/02; E21B 21/08; E21B 21/062;
(Continued)

(56) References Cited

U.S. PATENT DOCUMENTS

| 5,107,705 A | 4/1992 | Wraight et al. |
| 7,395,878 B2 | 7/2008 | Reitsma et al. |

(Continued)

FOREIGN PATENT DOCUMENTS

| GB | 2532967 | 6/2016 |
| NO | 343139 | 11/2018 |

(Continued)

OTHER PUBLICATIONS

Akersolutions, "Aker MH CCTC Improving Safety," Jan. 2008.
(Continued)

*Primary Examiner* — Neil R Mikeska
(74) *Attorney, Agent, or Firm* — Fish & Richardson P.C.

(57) ABSTRACT

A monitoring system includes an image sensor positioned about a rig, the image sensor directed at a drill string component positioned on the rig, and an onsite gateway communicably coupled to the image sensor and disposed proximate to the rig. The onsite gateway includes one or more processors, and a non-transitory computer-readable storage medium coupled to the one or more processors and storing programming instructions for execution by the one or more processors. The programming instructions instruct the one or more processors to receive an image stream of the drill string component from the image sensor, identify an operating parameter of the drill string component, generate an operating condition of the drill string component, determine that the generated operating condition meets a failure threshold of the drill string component, and send an instruction to drive a controllable device.

18 Claims, 16 Drawing Sheets

Related U.S. Application Data filed on Dec. 17, 2018, provisional application No. 62/780,843, filed on Dec. 17, 2018.

(51) Int. Cl.

| | |
|---|---|
| *G01N 21/88* | (2006.01) |
| *E21B 41/00* | (2006.01) |
| *E21B 47/00* | (2012.01) |
| *G06Q 30/06* | (2012.01) |
| *G06Q 50/02* | (2012.01) |
| *H04N 5/225* | (2006.01) |
| *E21B 47/11* | (2012.01) |
| *E21B 21/08* | (2006.01) |
| *E21B 44/02* | (2006.01) |
| *G01F 1/704* | (2006.01) |
| *G05B 19/4155* | (2006.01) |
| *G08B 21/18* | (2006.01) |
| *E21B 3/04* | (2006.01) |
| *E21B 19/00* | (2006.01) |
| *E21B 21/06* | (2006.01) |
| *E21B 21/10* | (2006.01) |
| *E21B 33/06* | (2006.01) |

(52) U.S. Cl.
CPC .......... *E21B 41/0092* (2013.01); *E21B 44/02* (2013.01); *E21B 47/00* (2013.01); *E21B 47/11* (2020.05); *G01F 1/704* (2013.01); *G01N 21/8851* (2013.01); *G05B 19/4155* (2013.01); *G06Q 30/0633* (2013.01); *G06Q 50/02* (2013.01); *G08B 21/187* (2013.01); *H04N 5/225* (2013.01); *E21B 3/04* (2013.01); *E21B 19/008* (2013.01); *E21B 21/062* (2013.01); *E21B 21/106* (2013.01); *E21B 33/061* (2013.01); *G05B 2219/31229* (2013.01); *H04N 2005/2255* (2013.01)

(58) Field of Classification Search
CPC .... E21B 21/106; E21B 41/0092; E21B 44/02; E21B 3/04; E21B 19/008; E21B 33/061; G01F 1/704; G01N 21/8851; G05B 19/4155; G05B 2219/31229; G06Q 30/0633; G06Q 50/02; G08B 21/187; H04N 5/225; H04N 2005/2255
See application file for complete search history.

(56) References Cited

U.S. PATENT DOCUMENTS

| | | | |
|---|---|---|---|
| 8,550,174 B1 | 10/2013 | Orgeron et al. | |
| 9,328,574 B2 | 5/2016 | Sehsah | |
| 9,355,440 B1* | 5/2016 | Chen | G01N 21/8851 |
| 2004/0182574 A1 | 9/2004 | Sarmad et al. | |
| 2008/0173480 A1 | 7/2008 | Annaiyappa et al. | |
| 2009/0164125 A1 | 6/2009 | Bordakov et al. | |
| 2014/0270793 A1 | 9/2014 | Bradford | |
| 2015/0091737 A1 | 4/2015 | Richardson et al. | |
| 2015/0345261 A1 | 12/2015 | Kruspe et al. | |
| 2016/0194157 A1* | 7/2016 | Senn | B65G 54/02 414/467 |
| 2017/0314369 A1* | 11/2017 | Rosano | H04N 13/271 |
| 2018/0240322 A1* | 8/2018 | Potucek | E04H 4/14 |
| 2018/0315111 A1* | 11/2018 | Alvo et al. | G06Q 30/06 |
| 2019/0009033 A1 | 1/2019 | Aykroyd et al. | |
| 2019/0011595 A1* | 1/2019 | Hou | E21B 44/00 |
| 2019/0078426 A1 | 3/2019 | Zheng et al. | |
| 2019/0078626 A1 | 3/2019 | Silsson | |
| 2019/0090056 A1* | 3/2019 | Rexach | G06F 3/167 |
| 2019/0090330 A1 | 3/2019 | Aykroyd et al. | |
| 2019/0100988 A1* | 4/2019 | Ellis | E21B 47/00 |
| 2019/0145183 A1* | 5/2019 | Potash | E21B 12/02 700/175 |
| 2019/0282089 A1 | 9/2019 | Wang | |
| 2020/0081439 A1* | 3/2020 | Mukherjee | B25J 15/0047 |
| 2020/0125225 A1* | 4/2020 | Bettles | E21B 47/00 |
| 2020/0149936 A1* | 5/2020 | Xu | H04L 67/12 |
| 2020/0190959 A1 | 6/2020 | Gooneratne et al. | |
| 2020/0190967 A1 | 6/2020 | Gooneratne et al. | |
| 2020/0368967 A1 | 11/2020 | Zhan et al. | |
| 2021/0340866 A1 | 11/2021 | Zhan et al. | |

FOREIGN PATENT DOCUMENTS

| | | |
|---|---|---|
| NO | 20161842 | 5/2019 |
| WO | 2017132297 | 8/2017 |
| WO | 2019055240 | 3/2019 |
| WO | 2019169067 | 9/2019 |
| WO | 2019236288 | 12/2019 |

OTHER PUBLICATIONS

Artymiuk et al., "The new drilling control and monitoring system," Acta Montanistica Slovaca, Sep. 2004, 9(3): 145-151.

PCT International Search Report and Written Opinion in International Appln. No. PCT/US2019/066549, dated Apr. 1, 2020, 19 pages.

Anwar et al., "Fog computing: an overview of big IoT data analytics," Wireless communications and mobile computing, May 2018, 2018: 1-22.

Bilal et al., "Potentials, trends, and prospects in edge technologies: Fog, cloudlet, mobile edge, and micro data centers," Computer Networks, Elsevier, Oct. 2017, 130: 94-120.

Dickens et al., "An LED array-based light induced fluorescence sensor for real-time process and field monitoring," Sensors and Actuators B: Chemical, Elsevier, Apr. 2011, 158(1): 35-42.

Liu et al., "Flow visualization and measurement in flow field of a torque converter," Mechanic automation and control Engineering, Second International Conference on IEEE, Jul. 15, 2011, 1329-1331.

Nuth, "Smart oil field distributed computing," The Industrial Ethernet Book, Nov. 2014, 85(14): 1-3.

PCT International Search Report and Written Opinion in International Appln. No. PCT/US2019/066577, dated Apr. 2, 2020, 18 pages.

PCT International Search Report and Written Opinion in International Appln. No. PCT/US2019/066602, dated Apr. 3, 2020, 15 pages.

GCC Examination Report in GCC Appln. No. GC 2019-38842, dated Nov. 8, 2020, 5 pages.

GCC Examination Report in GCC Appln. No. GC 2019-38843, dated Nov. 8, 2020, 6 pages.

GCC Examination Report in GCC Appln. No. GC 2019-38844, dated Nov. 5, 2020, 6 pages.

GCC Examination Report in GCC Appln. No. GC 2019-38844, dated May 20, 2021, 4 pages.

GCC Examination Report in GCC Appln. No. GC 2019-38842, dated May 19, 2021, 4 pages.

GCC Examination Report in GCC Appln. No. GC 2019-38843, dated May 18, 2021, 5 pages.

Magana-More et al., "Well control space out: a deep learning approach for the optimization of drilling safety operations," IEEE Access, 2021, 9, 14 pages.

Koulidis et al., "Field assessment of camera based drilling dynamics," presented at the SPE Middle East Oil & Gas Show and Conference, Manama, Bahrain, Nov.-Dec. 2021, 11 pages.

* cited by examiner

IMAGE BASED INSPECTION AND AUTOMATED INVENTORY AND SUPPLY CHAIN MANAGEMENT OF WELL EQUIPMENT

CROSS-REFERENCE TO RELATED APPLICATIONS

This application claims priority to U.S. Provisional Patent Application No. 62/780,833, filed Dec. 17, 2018, U.S. Provisional Patent Application No. 62/780,843, filed Dec. 17, 2018, and U.S. Provisional Patent Application No. 62/780,856, filed Dec. 17, 2018, the contents of while are hereby incorporated by reference.

TECHNICAL FIELD

This disclosure relates to image-based inspection of well equipment, for example, components of a drill sting being run into a well.

BACKGROUND

Drill rigs are used for drilling and producing hydrocarbons from a well, and include a large number of components and tools that perform complex and often time-consuming operations. Drilling a well is a challenging procedure due to the inability to see the trajectory of the well, rock formations, and the harsh environment downhole. These factors and the many uncertainties and variables during a drilling operation on a rig creates a dynamic drilling process. Monitoring the many components during operations on a rig can be difficult and ineffective, and delays or breakdowns in machinery and components can have a significant impact on time and cost during a drilling operation.

SUMMARY

This disclosure describes image-based inspection and monitoring of well components on a rig system.

In some aspects, a system includes an image sensor positioned about a rig, the image sensor directed at a drill string component positioned on the rig, and an onsite gateway communicably coupled to the image sensor and disposed proximate to the rig. The onsite gateway includes one or more processors, and a non-transitory computer-readable storage medium coupled to the one or more processors and storing programming instructions for execution by the one or more processors. The programming instructions instruct the one or more processors to receive an image stream of the drill string component from the image sensor, identify, from the image stream, an operating parameter of the drill string component, generate, from the image stream and the identified operating parameter, an operating condition of the drill string component, determine that the generated operating condition meets a failure threshold of the drill string component, and responsive to determining that the generated operating condition meets a failure threshold of the drill string component, send an instruction to drive a controllable device.

This, and other aspects, can include one or more of the following features. The operating parameter can include an integrity of the drill string component, and identifying the operating parameter can include analyzing the integrity of the drill string component. Generating an operating condition of the drill string can include determining a failure type of a feature of the drill string component. The failure type can include at least one of a crack, gouge, dent, pitting, wear, tear, or corrosion of the feature of the drill string component. The image sensor can include a high-definition camera. The image sensor can be one of a plurality of image sensors positioned about the rig. The plurality of image sensors can be at least partially directed at a drill string of the rig, where the drill string includes the drill string component. The image sensor can include an audio sensor configured to provide an audio stream to the onsite gateway. The controllable device can include a user interface, and sending an instruction to drive the controllable device can include displaying an inspection report of the drill string component on the user interface. The controllable device can include a printer, and sending an instruction to drive the controllable device can include sending an instruction to drive the printer to manufacture a replacement part of the drill string component. The drill string component can include at least one of a drill pipe, a drill bit, a tool joint, or a casing.

Certain aspects of the subject matter can be implemented as a method, for example, for monitoring a rig system. The method includes capturing, with an image sensor positioned about a rig, an image stream of a drill string component being run into a well, identifying, with an on-site gateway communicably coupled to the image sensor, an operating parameter of the drill string component from the captured image stream, generating, with the on-site gateway and from the image stream and the operating parameter, an operating condition of the drill string component, and determining that the generated operating condition meets a failure threshold of the drill string component. In response to determining that the operating condition of the drill string component meets the failure threshold, the method includes transmitting a signal to drive a controllable device. The controllable device can include a user interface, and transmitting a signal to drive a controllable device can include displaying an inspection report of the drill string component on the user interface. Transmitting a signal to drive a controllable device can include prompting a factory order of a replacement part for the drill string component. The controllable device can include a printer, and transmitting a signal to drive a controllable device can include prompting the printer to manufacture a replacement part for the drill string component. The drill string component can include at least one of a drill pipe, a drill bit, a tool joint, or a casing. Capturing an image stream of a drill string component can include capturing, with a plurality of image sensors including the image sensor, the image stream of the drill string component. Identifying an operating parameter of the drill string component from the captured image stream can include filtering the image stream using at least one of spatial domain or frequency domain filtering. Generating an operating condition of the drill string component can include determining a failure type of a feature of the drill string component, the failure type including at least one of a crack, gouge, dent, pitting, wear, tear, or corrosion of the feature of the drill string component. The operating parameter can include an integrity of the drill string component, and identifying an operating parameter can include analyzing the integrity of the drill string component.

In some aspects, a system includes an image sensor positioned about a rig, the image sensor directed at a component of a well tool positioned on the rig, and an onsite gateway communicably coupled to the image sensor and disposed proximate to the rig. The onsite gateway includes one or more processors, and a non-transitory computer-readable storage medium coupled to the one or more processors and storing programming instructions for execution by the one or more processors. The programming instructions instruct the one or more processors to receive an image stream of the component from the image sensor, identify, from the image stream, an operating parameter of the component, generate, from the image stream and the identified operating parameter, an operating condition of the component, determine that an automation rule includes the operating condition generated from the image stream, and responsive to determining that an automation rule includes the operating condition, send an instruction to drive a controllable device.

The details of one or more implementations of the subject matter described in this disclosure are set forth in the accompanying drawings and the description. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
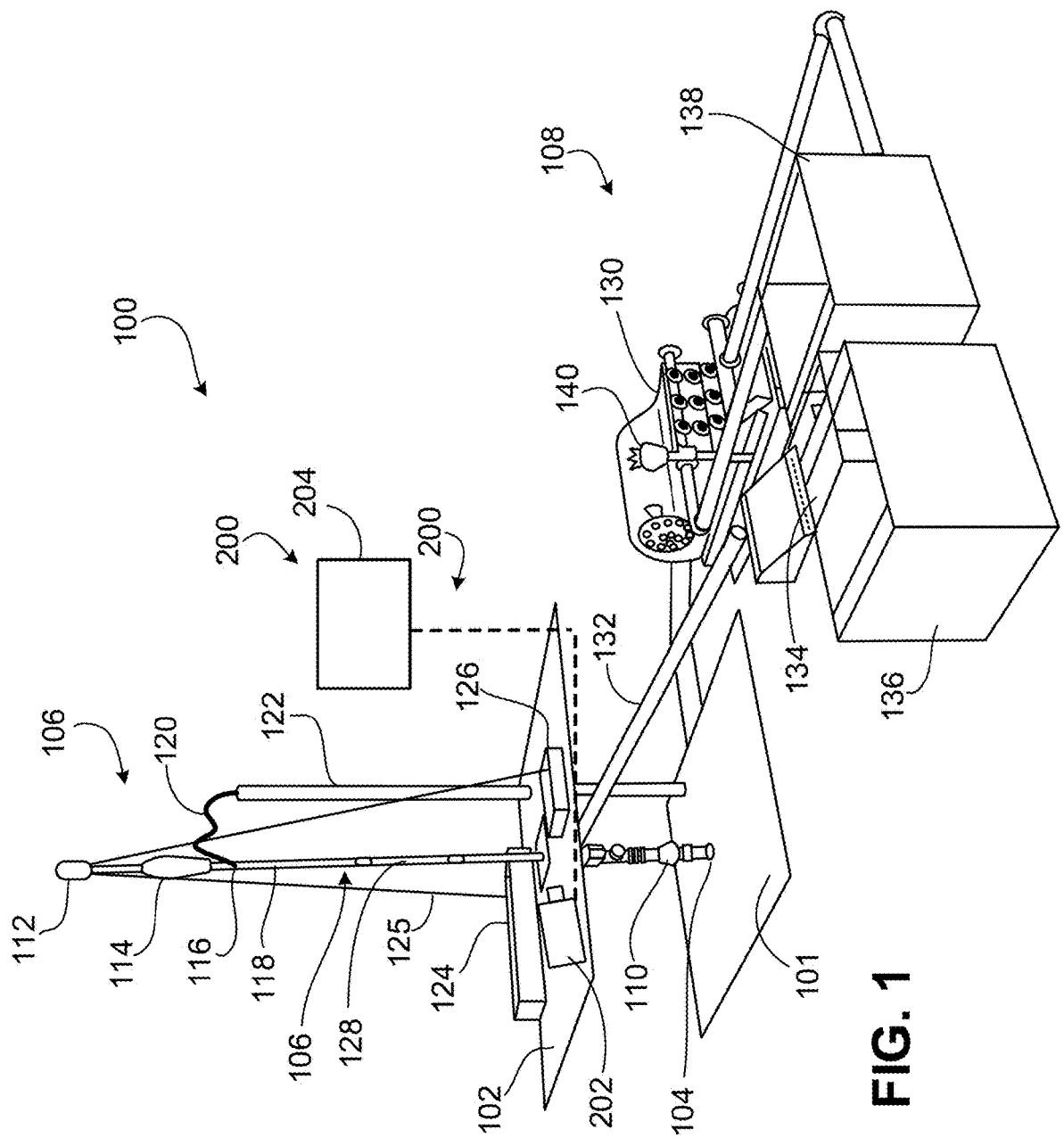
FIG. 1 is a partial schematic perspective view of an example rig system for a well including a monitoring system.

This disclosure describes intelligent monitoring and inspection of well components on a rig, including an image-based inspection and analysis of well components and equipment for wear and tear, or other failure modes. A monitoring system includes an image sensor and an on-site edge gateway positioned on a rig to monitor equipment and other well components, identify present or potential (future) failures in the integrity of the component(s), and propose (and in some instances, act on) a fix for the identified failures in the component(s), all in substantially real time. The well components that the monitoring system monitors can vary based on the target object of the image sensor, such as tools on a drill string, casing components, other well tools, or other well components on a rig. The image sensor, such as one or more cameras, is positioned about a rig and directed at a target component or group of components, and provides real-time image stream or feed, such as images or video feed, to the gateway computing system located on-site at the rig. The on-site edge gateway receives the image feed from the image sensor(s), and performs a processing and analysis of the image feed to identify an operating parameter of the targeted well equipment, determine an operating condition of the targeted well equipment based on the identified operating parameter, and propose, act on, or both propose and act on a fix based on the determined operating condition. In some examples, the determined operating condition includes the identification of a present or potential failure in the component that requires repair, replacement, or some other corrective action. The on-site edge gateway is an edge gateway, in that the computing system components of the gateway that perform the analysis are located locally on the rig, for example, without having to transfer information and data or outsource analysis to a remote computing system in order to propose or act on a fix to a determined operating condition. This monitoring system is able to continuously monitor well components in real time, and perform continuous image and signal processing to extract operating parameter information, identify operating conditions such as faults and anomalies in the well component, and propose a fix if the identified operating condition reaches a failure threshold of the well component. In some implementations, the gateway connects to a smart factory, a smart transportation and logistics center, a private cloud, a combination of these, or other facility to prompt and act on corrective actions, such as ordering, shipping, transporting, manufacturing, or otherwise addressing a failure of a component automatically, in response to a rig operator input, or both.

In conventional drill rigs, inspection of drill string components or other components is performed by in-person visual inspection, or by non-destructive inspection, such as ultrasonic- or electromagnetic-based inspection, and ordering replacement components involves manual entry of part numbers and other information after in-person visual inspection identifies a fault. These inspections and orders can be time-consuming, ineffective, and prone to human error, which can lead to significant and unplanned lost time and drilling costs. The monitoring system of the present disclosure provides real-time monitoring of well components using image sensors and advanced processing techniques, and identifies failure modes of well components from the image feed of the image sensors. Based on the identified failure mode(s), the monitoring system can propose action item options to a well operator or actively act on an action item, for example, that addresses the failure mode, such as ordering a replacement part from a manufacturer, requesting the shipment of a replacement part from a storage warehouse, or printing a replacement part on a printer (for example, 3D printer), among other action options. The monitoring system provides for synchronization of drilling operations and material supply operations for seamless integration and predictive maintenance of well components on a rig. For example, the monitoring system monitors and inspects drill string and casing components, as well as the various instruments and equipment on a drilling rig, and utilizes edge gateways and fog computing-based smart analytics to streamline the relationship between well component maintenance, inventory, and supply chain management. The monitoring system provides a network of dynamic, interlinked components that utilize smart sensors and smart devices to acquire data, actuators that respond to sensor information, communication to facilitate data transfer between devices, and machine learning/artificial intelligence/big data analytics to process, enrich and present the data in a way to initiate automatic action or prompted action to an operator. The monitoring system also allows to link the inspection results of drill pipes and casing components, as well as the various instruments and equipment on a drilling rig to drilling run parameters such as:

i) Surface and downhole weight-on-bit (WOB);
ii) Surface and downhole torque;
iii) Surface and downhole rate of penetration (ROP);
iv) Surface and downhole revolutions per minute (RPM);
v) Surface and downhole axial/lateral/torsional vibrations, shock, bit whirl and stick-slip;
vi) Formations drilled, rock strengths etc;
vii) Hole sections drilled;
viii) Drilling fluid density/viscosity/rheology;
ix) Tripping in/out times;
x) Connection times;
xi) On-bottom times; and
xii) Measurement-While-Drilling (MWD) and Logging-While-Drilling (LWD) data.

The correlations between the drilling run parameters and the inspection results aid in the development of predictive failure models for drill string and casing components, as well as the various instruments and equipment on a drilling rig. The behavior and wear/tear trends can also be simulated and predicted while drilling wells and tools/bits/components that are expected to fail can be manufactured in advance, which can significantly decrease the waiting time for a new tool/bit/component.

FIG. 1 is a partial schematic perspective view of an example rig system 100 for drilling and producing a well. The well can extend from the surface through the Earth to one or more subterranean zones of interest. The example rig system 100 includes a drill floor 102 positioned above the surface 101, a wellhead 104, a drill string assembly 106 supported by the rig structure and travelling block, a fluid circulation system 108 to filter used drilling fluid from the wellbore and provide clean drilling fluid to the drill string assembly 106, and a monitoring system 200 (including an image sensor 202 and an onsite edge gateway 204, and described in more detail later) to monitor in real time one or more components on the rig system 100. For example, the example rig system 100 of FIG. 1 is shown as a drill rig capable of performing a drilling operation with the rig system 100 supporting the drill string assembly 106 over a wellbore. The wellhead 104 can be used to support casing or other well components or equipment into the wellbore of the well.

The derrick or mast is a support framework mounted on the drill floor 102 and positioned over the wellbore to support the components of the drill string assembly 106 during drilling operations. A crown block 112 forms a longitudinally-fixed top of the derrick, and connects to a travelling block 114 with a drilling line including a set of wire ropes or cables. The crown block 112 and the travelling block 114 support the drill string assembly 106 via a swivel 116, a kelly 118, or a top drive system (not shown). Longitudinal movement of the travelling block 114 relative to the crown block 112 of the drill string assembly 106 acts to move the drill string assembly 106 longitudinally upward and downward. The swivel 116, connected to and hung by the travelling block 114 and a rotary hook, allows free rotation of the drill string assembly 106 and provides a connection to a kelly hose 120, which is a hose that flows drilling fluid from a drilling fluid supply of the circulation system 108 to the drill string assembly 106. A standpipe 122 mounted on the drill floor 102 guides at least a portion of the kelly hose 120 to a location proximate to the drill string assembly 106. The kelly 118 is a hexagonal device suspended from the swivel 116 and connected to a longitudinal top of the drill string assembly 106, where the kelly 118 transmits rotary motion and torque to the drill string assembly 106 as the rotary table (306 of FIGS. 3A-3B, described later) of the drill string assembly 106 turns.

Figure 3A:
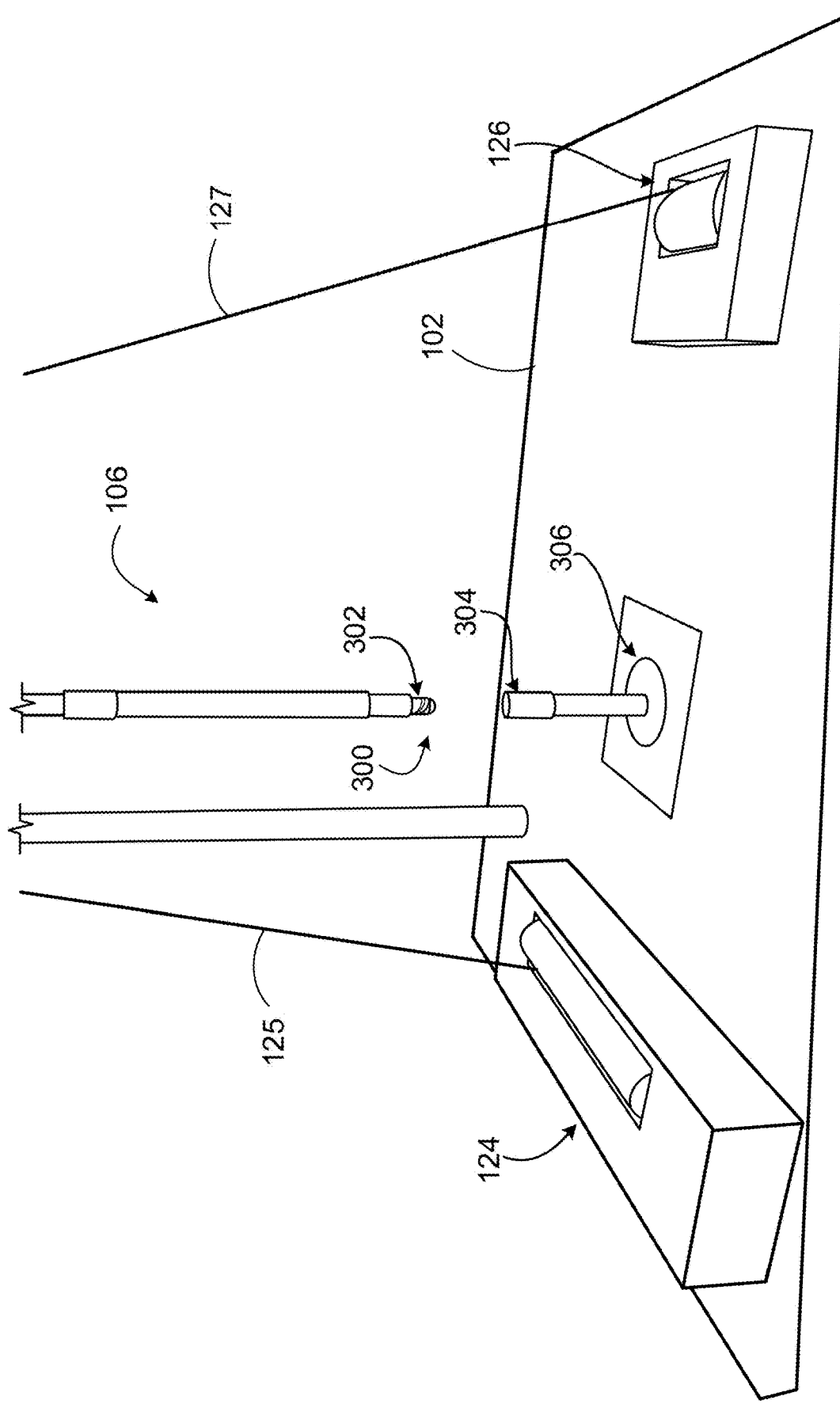
FIG. 3A is a partial schematic perspective view of the example rig system of FIG. 1 with a separated drill string connection.

In the example rig system 100 of FIG. 1, the drill string assembly 106 is made up of drill pipes 128 with a drill bit (not shown) at a longitudinally bottom end of the drill string. The drill string assembly 106 is described in more detail later, and a more detailed view is shown in FIG. 3A. The drill pipe can include hollow steel piping, and the drill bit can include cutting tools, such as blades, discs, rollers, cutters, or a combination of these, to cut into the formation and form the wellbore. The drill bit rotates and penetrates through rock formations below the surface under the combined effect of axial load and rotation of the drill string assembly 106. The kelly 118 also transmits rotary motion, torque and weight-on-bit to the drill bit. In some implementations, the kelly 118 and swivel 116 can be replaced by a top drive that allows the drill string assembly 106 to spin and drill. The rig system 100 can also include a drawworks 124 and a deadline anchor 126, where the drawworks 124 includes a winch that acts as a hoisting system to reel the drilling line in and out to raise and lower the drill string assembly 106 by a fast line 125. The deadline anchor 126 fixes the drilling line opposite the drawworks 124 by a deadline 127, and can measure the suspended load (or hook load) on the rotary hook. The weight on bit (WOB) can be measured when the drill bit is at the bottom the wellbore. The rig system 100 also includes a blowout preventer 110 positioned at the surface 101 of the well and below (but often connected to) the drill floor 102. The blowout preventer 110 acts to prevent well blowouts caused by formation fluid entering the wellbore, displacing drilling fluid, and flowing to the surface at a pressure greater than atmospheric pressure. The blowout preventer 110 can close around (and in some instances, through) the drill string assembly 106 and seal off the space between the drill string and the wellbore wall.

During a drilling operation of the well, the circulation system 108 circulates drilling fluid from the wellbore to the drill string assembly 106, filters used drilling fluid from the wellbore, and provides clean drilling fluid to the drill string assembly 106. The example circulation system 108 includes a fluid pump 130 that fluidly connects to and provides drilling fluid to the drill string assembly 106 via the kelly hose 120 and the standpipe 122. The circulation system 108 also includes a flow-out line 132, a shale shaker 134, a settling pit 136, and a suction pit 138. In a drilling operation, the circulation system 108 pumps drilling fluid from the surface, through the drill string assembly 106, out the drill bit and back up the annulus of the wellbore, where the annulus is the space between the drill pipe and the formation or casing. The density of the drilling fluid is intended to be greater than the formation pressures to prevent formation fluids from entering the annulus and flowing to the surface and less than the mechanical strength of the formation, as a greater density may fracture the formation, which creates a path for the drilling fluids to go into the formation. Apart from well control, drilling fluids can also cool the drill bit and lift rock cuttings from the drilled formation up the annulus and to the surface to be filtered out and treated before it is pumped down the drill string assembly 106 again. The drilling fluid returns in the annulus with rock cuttings and flows out to the flow-out line 132, which connects to and provides the fluid to the shale shaker 134. The flow line is an inclined pipe that directs the drilling fluid from the annulus to the shale shaker 134. The shale shaker 134 includes a mesh-like surface to separate the coarse rock cuttings from the drilling fluid, and finer rock cuttings and drilling fluid then go through the settling pit 136 to the suction pit 136. The circulation system 108 includes a mud hopper 140 into which materials (for example, to provide dispersion, rapid hydration, and uniform mixing) can be introduced to the circulation system 108. The fluid pump 130 cycles the drilling fluid up the standpipe 122 through the swivel 116 and back into the drill string assembly 106 to go back into the well.

The example rig system 100 can take a variety of forms and include a number of different components. For example, the drillstring assembly 106 can include additional or different components than the example shown in FIG. 1. Similarly, the circulation system 108 can include additional or different components than the example shown in FIG. 1.

The example rig system 100 also includes the monitoring system 200 that monitors a component of the drill string assembly 106, continuously inspects the component for integrity failure, and proposes (and in some instances, acts on) a remedial action in instances where an operating condition of the component has a failure mode greater than a failure threshold. The monitoring system includes an image sensor 202, shown schematically in FIG. 1 as a camera, and an on-site edge gateway 204. The image sensor 202 is positioned about the rig, for example, disposed on the rig floor 102 and directed at a component of the drill string assembly 106 positioned on the rig floor 102. The image sensor 202 provides an image stream, such as one or more images or a video feed, of the component of the drill string assembly 106. The gateway 204 is communicably coupled to the image sensor 202, and receives the image feed from the image sensor 202. The image sensor 202 can communicate with the gateway 204 in a variety of ways, such as over a wired connection or a wireless connection (for example, over Bluetooth, Wi-Fi, ZigBee, 6Lo, or other wireless technology).

The image sensor 202 provides component detection, captures an image feed of the component during staging or operation of the component (for example, during drilling of the well, or tripping into or out of the well). The image sensor 202 can take a variety of forms. For example, the image sensor 202 can include a camera, such as a camera that is smart, waterproof, high-resolution, wireless, or a combination of these features. In some examples, the camera has a resolution fine enough to identify deficiencies as small as 50 micrometers, for example, when analyzing drill bits. In some instances, the image sensor 202 includes an optical filter, such as an ultraviolet (UV) filter, infrared (IR) filter, a combination of these, or another filter type. In certain examples, the image sensor 202 includes a charge coupled device (CCD) camera, machine vision camera, CCD machine vision camera, digital camera, infrared camera, x-ray camera, thermal camera, acoustic camera, ultraviolet camera, ultrasonic imaging camera, magnetic resonance imaging camera, point cloud scanner, laser scanner, LIDAR scanner, a combination of these sensors, or another image sensor type. Several factors can affect the captured images from the image sensor 202, such as lightning, location of sensors or cameras, angle of and placement of sensors or cameras, number of sensors, a combination of these, or other factors. If the image sensor(s) 202 are on the rig floor to identify deficiencies of components when the components are coming out of a well, then these components would likely have to be cleaned and dried first, as they would be covered in drilling mud, before the image sensor 202 would be able to analyze the components. If these components are pulled out of the well for a short period of time before they are lowered into the well again, then the inspection can be performed on the drill floor. If the components are disconnected from the drillstring assembly after a job, then they can be inspected in a much more controlled environment such as a warehouse, where any preferred treatments can be applied to optimize the inspection procedure.

The image sensor 202 provides a non-invasive image capture of the component, and provides the image feed to the gateway 204. While the monitoring system 200 of FIG. 1 shows only one image sensor 202, the monitoring system can include more than one image sensor, such as a plurality of cameras positioned about the drill string component. In some implementations, a plurality of image sensors can provide an image feed that represents a three-dimensional model of the component to the gateway 204. For example, multiple image sensors 202 can be positioned evenly or unevenly about a component to provide an image feed to the gateway 204 representative of a three-dimensional view of the component. The image sensor 202 can be disposed anywhere about the rig system 100, given that the image sensor 202 is directed at the component to provide an image feed of the component. In some implementations, the image sensor 202 is mounted on a movable support that can move and position the image sensor 202, for example, to follow a particular component over multiple views or during movement of the component, switch from one component to another, or a combination of these. In some implementations, the monitoring system 200 includes an audio sensor, in addition to or instead of the image sensor 202, to provide an audio feed to the gateway 204.

The gateway 204 is positioned on-site, or locally, on the rig, and acts as an edge/fog computing system. In other words, the on-site edge gateway 204 includes computing components located on-site, in that the computing components that perform the analysis of the image feed from the image sensor(s) 202 are located locally on the rig. This edge/fog computing setup of the gateway 204 localizes processing and analysis at the gateway 204, for example, without need for transferring information and data or outsourcing analysis and processing to a remote computing system in order to function. The gateway 204 includes one or more processors and a non-transitory computer-readable storage medium used in the reception and analysis of the input from the image sensor 202, as described in more detail later. The image sensor 202 provides the image feed of the one or more well components to the on-site edge gateway 204, and the gateway 204 identifies present or potential failures in the integrity of the component(s). The gateway 204 can also propose (and in some instances, act on) a fix for the identified failures in the component(s), all in substantially real time. Real time, for example, can mean that the image feed is provided continuously and substantially instantaneously from the image sensor 202 to the gateway 204, and the identification and determination of a particular operating parameter, operating condition, and failure mode of a feature of the component occurs substantially instantaneously.

In some implementations, the image sensor 202 acquires the image feed, and the image sensor 202 or the gateway 204 (or both) performs pre-processing and image enhancement. For example, image processing can include pre-processing, image enhancement, image segmentation, feature extraction, image classification, target detection, a combination of these, or other steps. Detection of a specific object, target, feature, or condition in a stationary or dynamic setting can be performed by various image processing techniques, such as pattern recognition, edge detection, wavelets, pixelation, texture, connectivity component based approach, principle and independent component analysis, descriptors based methods, linear filtering (for example, spatial domain or frequency domain filtering), anisotropic diffusion, grey-level segmentation or thresholding methods, a combination of these, or other techniques. The edge-fog computing of the gateway 204 provides for machine learning and artificial intelligence to enable a wide adoption of image processing in various industries, including drilling, where algorithms can be constructed to rapidly process real-time datasets.

The gateway 204 receives the image feed from the image sensor(s) 202 and performs a processing and analysis of the image feed. The processing and analysis of the image feed includes identifying an operating parameter of the targeted well component, generating an operating condition of the well component from the operating parameter, and in some instances, determining that the operating condition meets a failure threshold of the component. For example, the operating parameter can be an integrity of the well component, an orientation or position of the well component, or another parameter of the well component. The operating condition can include a type of wear, tear, or failure of the component. For example, the operating condition can include the presence of a crack, gouge, dent, pitting, corrosion, a combination of these, or other wear and tear of a feature of the well component. Determining that the operating condition meets a failure threshold of the component can include a determination that the particular type of wear, tear, or failure of the component is significant enough to prompt a repair, replacement, or other remedial action of the component. This significance limit is the failure threshold of the component, and can be identified based on test data and experimentation. For example, if the size (for example, width, length, or depth) of an identified crack, gouge, or dent is greater than a set of size dimensions defining the failure threshold, then the component can be determined to require repair, replacement, or another remedial action. If the size of the identified crack, gouge, or dent is less than the set of size dimensions defining the failure threshold, then the component can be determined not to require repair, replacement, or other remedial action. Based on this determination, the gateway 204 can prompt an automation rule, and can send instructions to drive a controllable device, as described in greater detail later.

In some instances where the operating condition of the component meets a failure threshold, the gateway 204 can propose, act on, or both propose and act on a remedial action to address the failure of the component. The remedial action can vary based on the type of failure, the significance of the failure, or other factors. In some instances, if the gateway 204 determines that the generated operating condition meets a failure threshold of the component, the gateway 204 identifies and acts on an automation rule that exists for the generated operating condition of the component. The automation rule can vary, and includes sending a signal or instructions to drive a controllable device. The controllable device can include a user interface for a rig operator to observe, a printer (such as a 3D printer) to fabricate a replacement part, a factory fabrication system that prompts the retrieval or fabrication of a replacement part, a transportation system that prompts transportation of the replacement part to the rig system 100, a smart machine such as a robot that performs a maintenance job on a component or moves a deficient component and replaces it with a new component, a combination of these controllable devices, or other devices. In some examples, the edge gateway 204 can prompt vehicles or mobile robots in warehouses to move raw materials in factories to fabricate components as needed, to optimize performance, or both. The edge gateway 204 can also provide specific instructions to a series of machines in a factory to manufacture new tools and components, which can make production more efficient and have shorter lead times. Another example can include the automatic control of vehicles to either move from the rig with a deficient tool or component to the factory or move from the factory to the rig with a new tool or component.

The well component that the monitoring system 200 inspects can vary, for example, based on the target object of the image sensor 202. In the example rig system of FIG. 1, the image sensor 202 is directed at a component of the drill string assembly 106, such as the drill pipe 128 or drill bit. However, the image sensor 202 can be directed at and provide an image feed of a different component of the drill string assembly 106, or of another component on the rig system 100. For example, the well component can include drill pipes, drill pipe connectors, drill pipe collars, heavyweight drill pipes and collars, cross over subs, tubulars, stabilizers, packers, drilling jars, downhole motors, reamers, drill bits, drill bit subs, casing components such as casings, liners, casing collars, and casing centralizers, a combination of these components, or other components. In some examples, the image sensor 202 is directed at a component of the wellhead 104 or drill string assembly 106, such that the monitoring system 200 inspects and monitors the integrity of a component of the wellhead 104 or drill string assembly 106 during operation of the rig system 100.

Figure 2A:
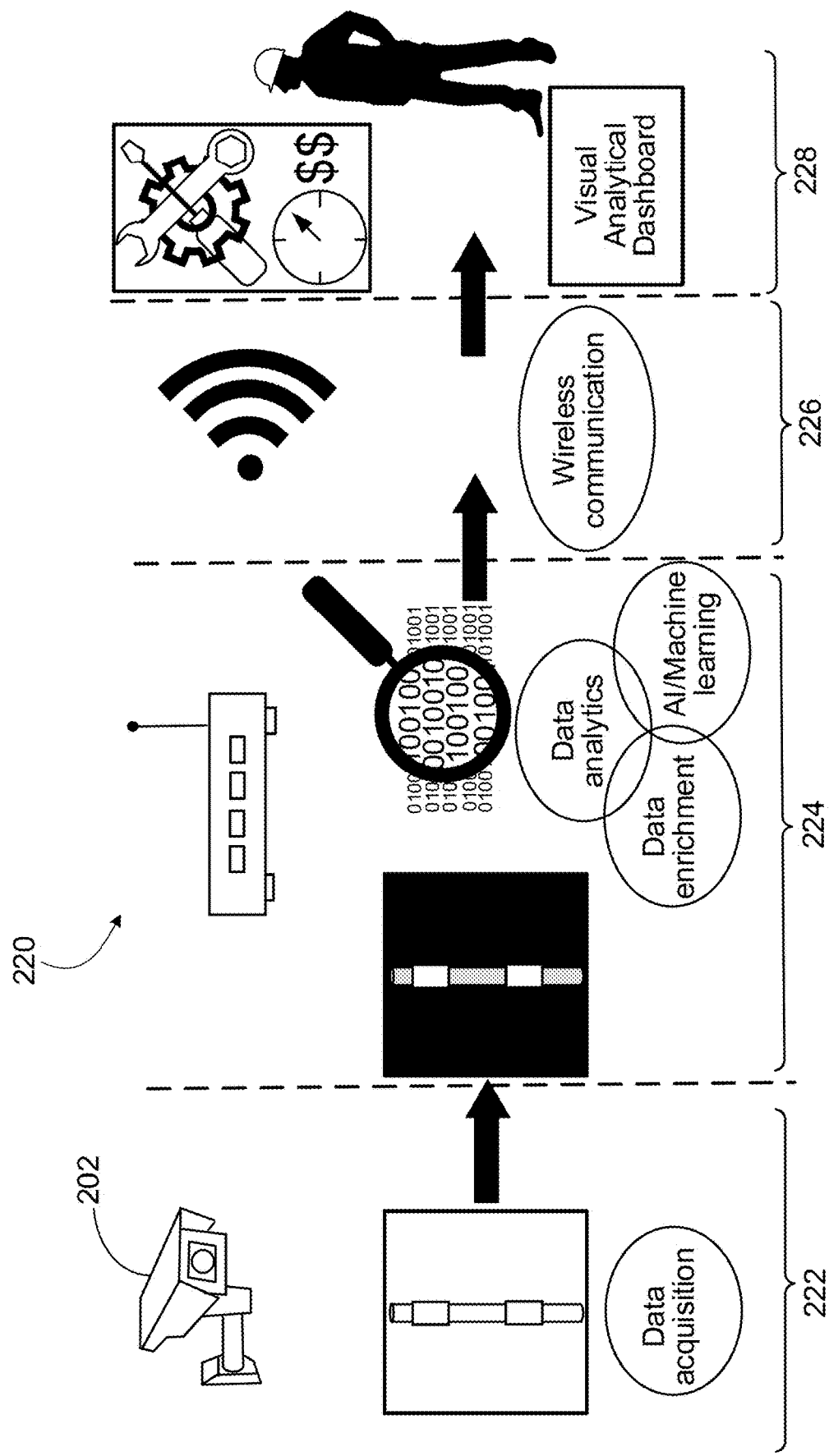
FIG. 2A is a system diagram of the monitoring system of FIG. 1 showing an example order of operations by the monitoring system.

FIG. 2A is a system diagram 220 of the monitoring system 200 of FIG. 1, where the system diagram 220 shows an example order of operations by the monitoring system 200. At 222, a smart sensor (for example, image sensor 202) acquires an image feed, video feed, audio feed, a combination of these, or other data of a target well component. At 224, smart analytics (for example, gateway 204) utilizing edge/fog computing locally analyzes the image feed and other data from the smart sensor. The image feed and other data are streamed to the edge/fog computer connected wired or wirelessly to the smart sensor. Edge/fog computing can be used to get past challenges around the large amounts of data that is captured by the image sensor 202 by performing smart analytics to trigger or respond to a specific operating condition of the well component or feature(s) of the streaming data, such as the drill pipe connectors as shown in step 222 of FIG. 2A. This computing can include simple object recognition (for example, detection of an operating parameter of the well component) to detecting dynamic features of an image (for example, operating condition), such as vibration. In some instances, an audio feed detected by the image sensor 202 can be a useful feed to measure during the drilling process. Images, video, and audio can be compared with standards or models stored in the gateway 204, and data analytics and enrichment, machine learning, artificial intelligence, or a combination of these can be used to initiate control action.

Processing and converting data at the on-site, edge/fog gateway 204 provides real-time insight and action, as opposed to a delayed analysis over a cloud environment. The cloud covers a wide geographic area or at a global scale, so transferring data from sensors and devices to a cloud increases the network traffic and adds latency to the process. On the other hand, processing data at the on-site edge gateway 204 with edge/fog computing reduces the number of switches and hosts between a data source and destination, which decreases the time between image feed acquisition and smart analytics and enables rapid decision making. The cloud also introduces security and privacy concerns with a high probability of attack on data en route, since the location of server nodes in a cloud can be within the internet, whereas in an edge/fog environment, it is substantially or completely confined to the edge of a local network. Therefore, the image sensor 202 (or other smart sensors and devices) can be controlled, and sensitive data can be analyzed by the gateway 204, locally. Moreover, the security can be defined by using similar cyber security and privacy policies and procedures used in other parts of the local environment. In an event that data is to be sent to a central server or other server outside of the local gateway 204, the gateway 204 can send truncated actionable information (rather than all the acquired data) in an anonymous way. This improves security of the information, minimizes privacy risks, and can also reduce the bandwidth required to transfer data.

In a highly dynamic environment like drilling, the edge/fog computing of the gateway 204 provides critical, time-sensitive decisions on the rig, close to the drilling operations. The monitoring system 200 with the gateway 204 identifies present and future failures and deficiencies of a well component, improves response time to the identified failures or deficiencies, and can increase efficiency and boost output. The gateway 204 can improve the way raw data is extracted and enriched from the image sensor, and can utilize other technologies such as artificial intelligence, machine learning algorithms, and data analytics to continuously analyze the image feed and perform smart analytics to identify and highlight critical or specific patterns, anomalies, characteristics, properties, events, trends, or other failures or deficiencies. The gateway 204 performs smart analytics and deep learning from the constant stream of data even in the absence of a solid internet connection. Therefore, the monitoring system 200 can be utilized locally, on drilling rigs, with use of technologies such as Bluetooth, Wi-Fi, ZigBee, 6Lo, or other wireless technology. The gateway 204 can be programmed to analyze and act on information automatically. The gateway 204 can also select critical data and events from constant image feed and send them through for human intervention to initiate action. For example, at 226 of FIG. 2A, the gateway 204 transmits data flow (wirelessly or wired) to a local display, user interface, or other target destination. At 228, an action or decision is made based on the transmitted data flow automatically, by a well operator, or other way. The edge gateway 204 has computing resources, software resources, network resources and software services and can issue control commands to actuators, which can be either binary or continuous actuators. For example, a hydraulic, pneumatic, electrical, electromagnetic, electromechanical, or micro/nano actuator can perform or initiate an action when triggered.

The monitoring system 200 captures image feed of, and analyzes and inspects, one or more of the components of the rig system 100, such as the drilling string components of the drill string assembly 106. The gateway 204 analyzes the image feed, and can provide a number of results, such as:

Identify and provide one or multiple sets of issues, failures, or deficiencies with the well component to a user interface for rig operator inspection Rank the problems by criticality, for example, highest significance issues first Identify a set of action alternatives, and in some instances, present these action alternatives to a user interface for rig operator inspection Identify a best option out of multiple action options for an identified problem Guide the rig operator on how to solve a problem Obtain approval from the rig operator to execute a specific action to solve a problem Execute a specific action automatically to solve a problem, then inform the rig operator Execute a specific action automatically to solve a problem, and in some instances, inform the rig operator if requested by the rig operator Execute a specific action automatically to solve a problem, and in some instances, inform the rig operator of the outcome Automatically make a decision on a course of action to address the problem, and execute the course of action In some implementations, the gateway 204 identifies, from the image stream from the image sensor 202, an operating parameter of the component. From the identified operating parameter and the image stream, the gateway 204 generates an operating condition of the component. In some instances, the gateway 204 determines that the generated operating condition meets a failure threshold of the component, determines that an automation rule exists for the generated operating condition of the component, or determines both of these steps. In instances where the gateway 204 determines that the operation condition meets the failure threshold or determines that an automation rule exists for the operating condition, the gateway 204 can send a signal or instruction to drive a controllable device. The controllable device can vary. In some examples, the controllable device includes a user interface, where the user interface displays information from the gateway 204 regarding the operating condition of the component, and a rig operator can interact with the user interface to decide a course of action. In certain examples, the controllable device includes a printer, such as a 3D printer, that can print a replacement or repair part or component to address an issue identified with the well component.

Figure 2B:
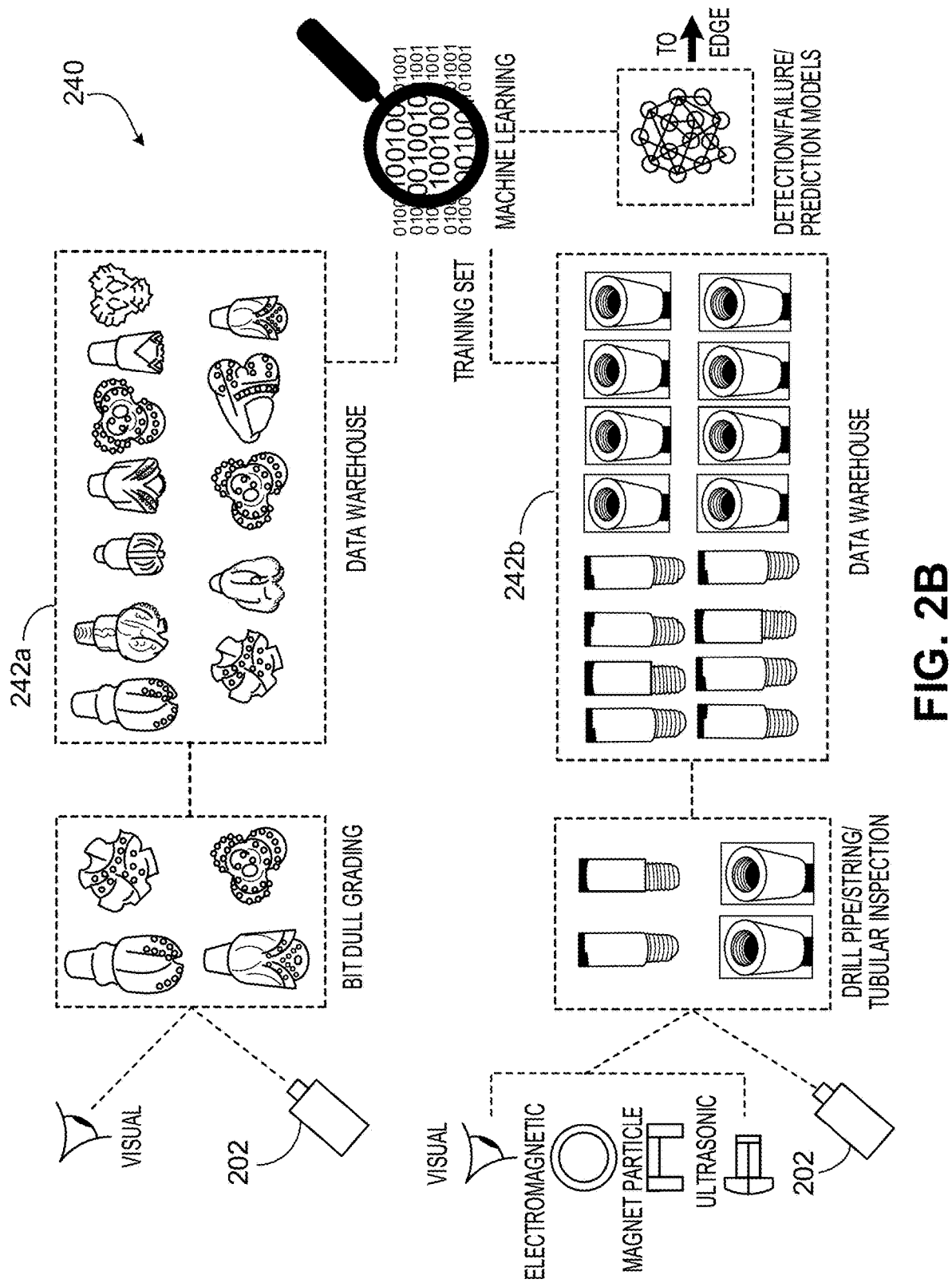
FIG. 2B is a schematic process diagram showing example scenarios for utilizing a training data set to develop example detection, failure, or prediction models that can be used in the monitoring system of FIG. 1.

FIG. 2B is a schematic process diagram 240 showing example scenarios for utilizing a training data set to develop example detection, failure, or prediction models that can be used in the monitoring system 200 of FIG. 1. The detection/failure/prediction models can be utilized by the monitoring system 200, for example, based on captured image feed data by the image sensor 202 separate from or in combination with visual inspection of a component. The example processing steps of the process diagram 240 that allow the edge/fog computing system to determine or predict a failure of a component depends on first building a data warehouse of components (for example, bits, pipes, casings, tools, or other well components), such as the drill bit data warehouse 242a or the pipe data warehouse 242b as shown in FIG. 2B.

In some instances, drill bits (such as polycrystalline diamond compact (PDC) and roller cone bits) are analyzed for wear and tear by visual inspection according to the International Association of Drilling Contractors (IADC) dull grading system. This system has eight main sections that cover inner cutting structure, outer cutting structure, dull characteristics, location, bearings and seals, gauge, other dull characteristics, and the reason pulled. Drill pipes, casings, and tools can also be analyzed by visual inspection as well as other non-destructive techniques such as electromagnetic, magnetic particle, liquid dye penetrant and ultrasonic methods. Depending on the requirement, these inspections can be according to American Petroleum Institute (API) Recommended Practice (RP) 7G/2, DS-1 Volume 3, or NS-2 standards. Drill bits, pipes, casings, tools, or other components are scanned by cameras or other image sensors on drilling rigs and in warehouses multiple times and at different angles, when they are new and used, to build pre- and post-run models. The models are analyzed for wear and tear by training algorithms and correlated with visual analysis for drill bits, and additionally with electromagnetic, magnetic particle, and ultrasonic testing methods for pipes, casings, tools, or other well components. During this initial training phase, various technical assumptions are assessed and rules or critical levels are established to help select the best-fit machine learning algorithm.

The correlation results of camera based analysis and the standard drill bit, pipe, casing, tool, or other component inspection results are used to develop procedures and acceptance criteria so that the drill bits or other components in the data warehouse have a common tag. The common tags are a digital measure that indicate the percentage of wear and tear with an index for condition of the component, for example at a scale of 0 to 10, where 0 is excellent and 10 is unusable. This information can be utilized as training set data to build detection, failure, and prediction models by machine learning methods such as convolutional neural networks (CNN). Common tags can also be linked to drilling run parameters such as:

i) Surface and downhole weight-on-bit (WOB);
ii) Surface and downhole torque;
iii) Surface and downhole rate of penetration (ROP);
iv) Surface and downhole revolutions per minute (RPM);
v) Surface and downhole axial/lateral/torsional vibrations, shock, bit whirl and stick-slip;
vi) Formations drilled, rock strengths etc;
vii) Hole sections drilled;
viii) Drilling fluid density/viscosity/rheology;
ix) Tripping in/out times;
x) Connection times;
xi) On-bottom times; and
xii) Measurement-While-Drilling (MWD) and Logging-While-Drilling (LWD) data.

These drilling run parameters can be utilized to identify hidden patterns or correlations in the data and detect abnormal data patterns, root cause analysis, or both, for example, to reveal specific causes and events for wear and tear. The recognized data patterns can be utilized to obtain fatigue probability and predicted failure times for well components in future runs inside wells. This information can be utilized to optimize future drilling operations on rigs, for example by selecting drilling parameters to reduce wear and tear.

Figure 2C:
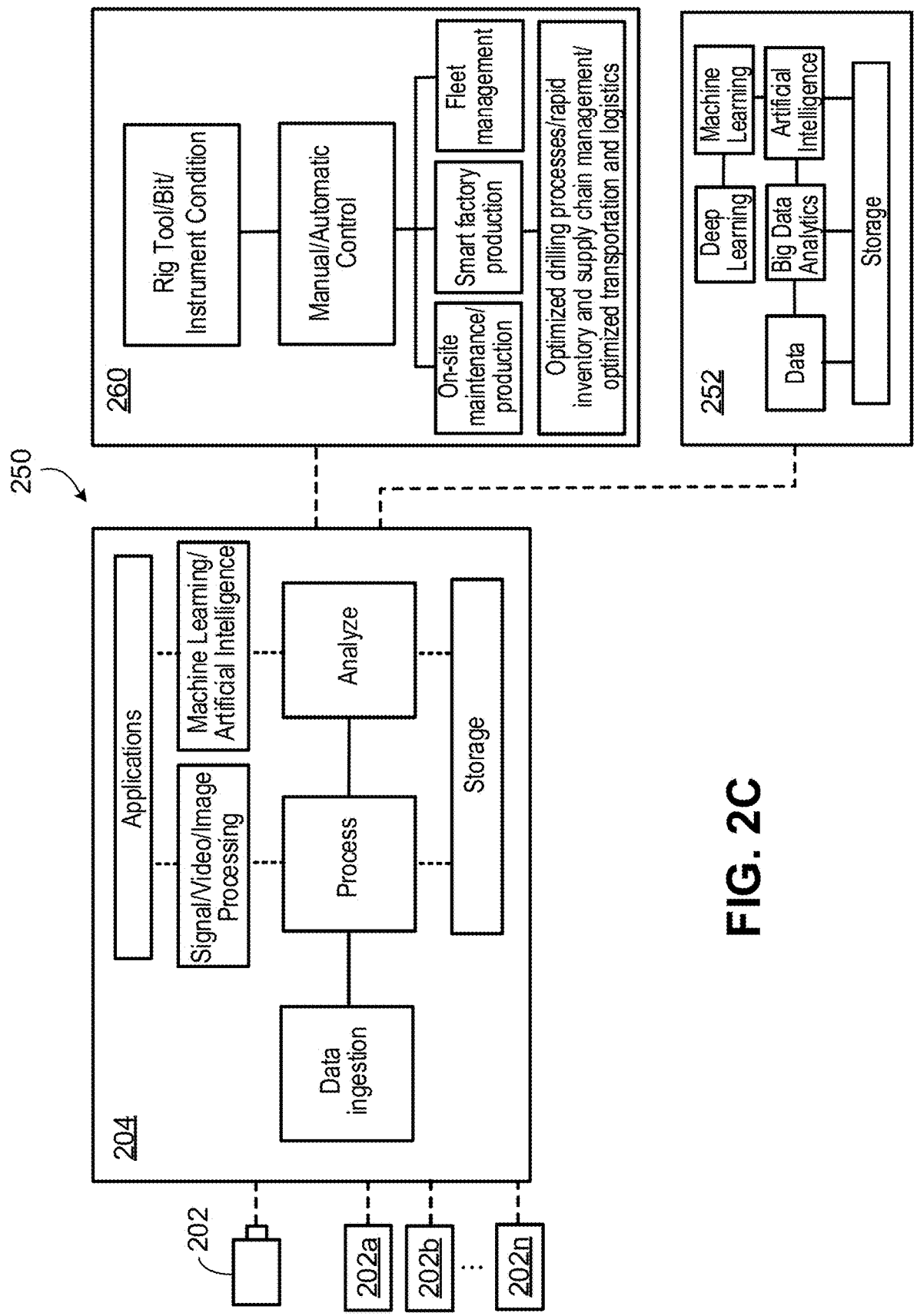
FIG. 2C is a schematic diagram of the example monitoring system of FIG. 1, including the image sensor and the edge gateway.

These models described earlier with respect to FIG. 2B are loaded into the machine learning/artificial intelligence module of the computing system of the on-site edge gateway 204. FIG. 2C is a schematic diagram 250 of the example monitoring system 200, including the image sensor 202 and the edge/fog gateway 204. The monitoring can include additional image sensors (such as sensors 202a, 202b, . . . 202n). The additional sensors can include one or more additional image sensors, one or more audio sensors, or another sensor. The example scenarios of the schematic process diagram 250 of FIG. 2C, which provide example detection, failure, and prediction models of well components, can be performed in a private cloud 252 of the example monitoring system 200. The onsite gateway 204 can be communicably coupled to the private cloud 252, which can be used to provide or store data acquired by the onsite gateway 204. The cloud 252 can be used to store large amounts of data, for example, terabytes of data. Various operations can be performed in the cloud 252 separately from the onsite gateway 204. For example, deep learning algorithms, machine learning algorithms, artificial intelligence algorithms, big data analytics, or any combination of these can be performed in the cloud 252. In some implementations, one or more optimization parameters can be determined by any one or more of such operations on the private cloud 252, and the one or more optimization parameters can be transmitted to the onsite gateway 204 to improve operations and calculations performed by the onsite gateway 204. The operations performed in the cloud 252 need not occur locally on the rig.

The edge gateway 204 can include a computer system having a data ingestion module to acquire the data from the image sensor 202 on the rig floor 102. The raw data can be sent to a process layer, where one or more processing operations can be performed. For example, the processing operations in the process layer for signal, video, or image processing can include analog or digital signal processing, pattern recognition, edge detection, wavelet transform processing, pixelated processing, image texture processing, component-based approach connectivity processing, principle component analysis, independent component analysis, descriptors based methods, linear filtering, anisotropic diffusion operations, traditional grey-level segmentation, image thresholding methods, or any combination of these operations. The processed data can be sent to an analysis module of the gateway 204, where the analysis module can perform one or more analysis operations. For example, the analysis operations in the analysis module can include machine learning algorithms or artificial intelligence algorithms. Such algorithms can be based on the developed detection, failure, and prediction models utilized to obtain the condition of a well component.

The onsite gateway 204 can communicate with and actuate components on the rig system 100 or elsewhere. For example, the example schematic diagram 250 includes an actionable insights module 260 connected to the onsite gateway 204. Actionable insights of the actionable insights module 260 gained from the onsite edge gateway 204 can be used for manual or automatic intervention for actuation, control, or triggering of processes for on-site maintenance, on-site production, manufacturing processes in off-site factories, coordination mechanisms for transportation and logistics, or a combination of these. The actionable insights, the processed data in storage, or both, can also be sent to the private cloud 252 for big data analytics and deep learning, as well as for storage of historical data. The detection, failure, and prediction models can be updated regularly to find dependencies and discover patterns and insights in the machine learning data sets. New data that the image sensor(s) 202 acquires on drilling rigs, such as the example rig system 100 of FIG. 1, and in warehouses are utilized to revise, re-train, and re-test as desired or required.

Figure 3B:
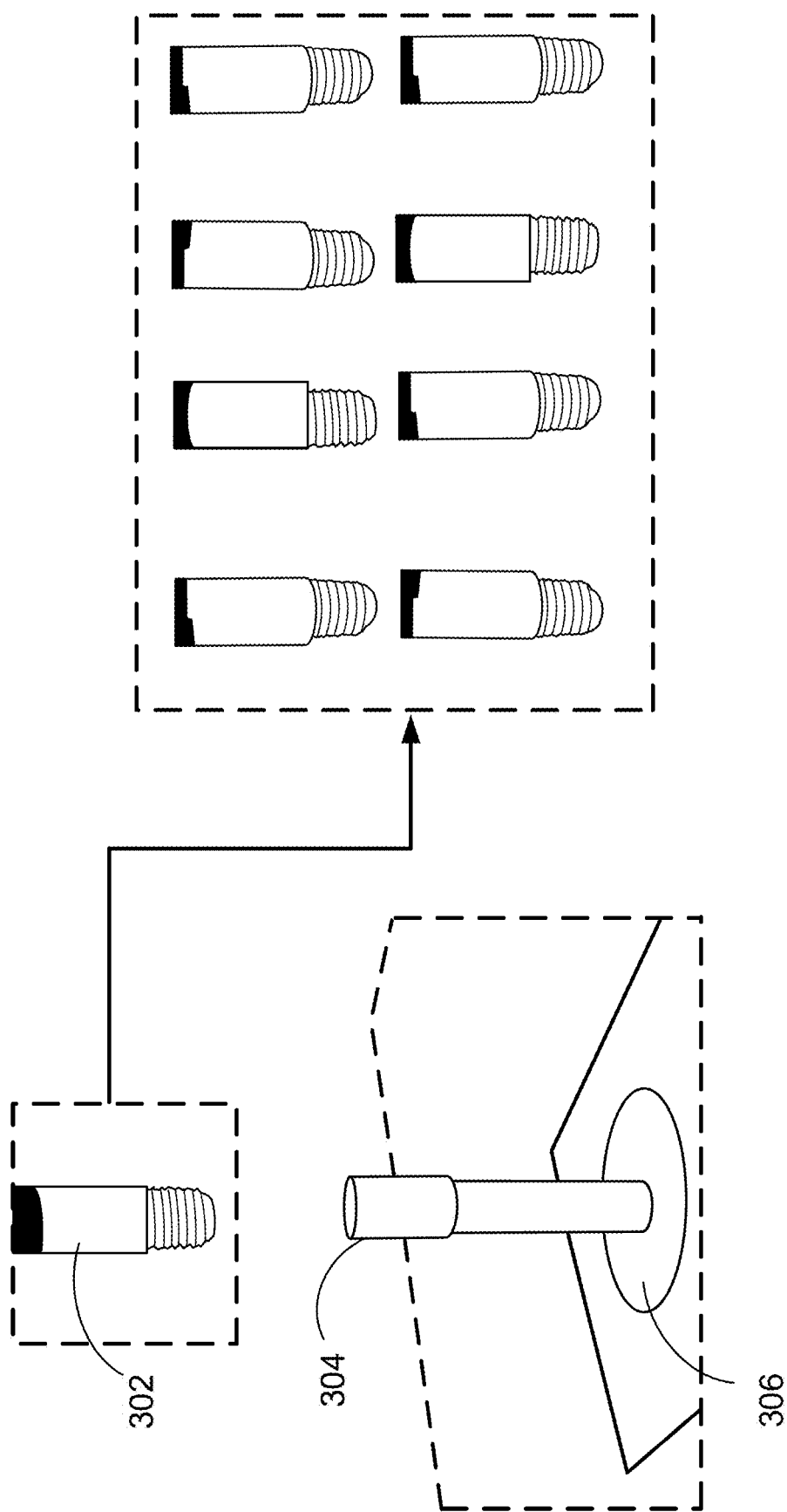
FIGS. 3B and 3C are close-up views of the separated drill string connection of FIG. 3A.
Figure 3C:
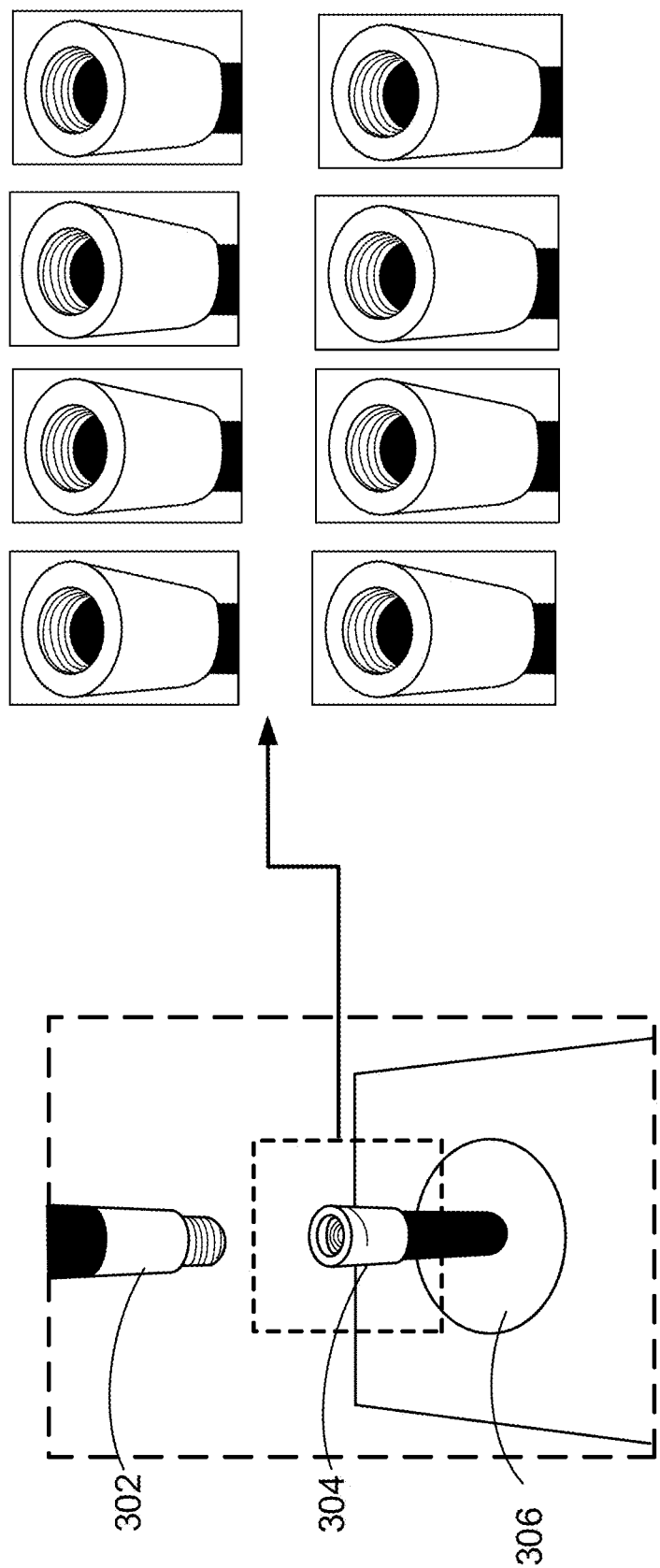
Figure 4A:
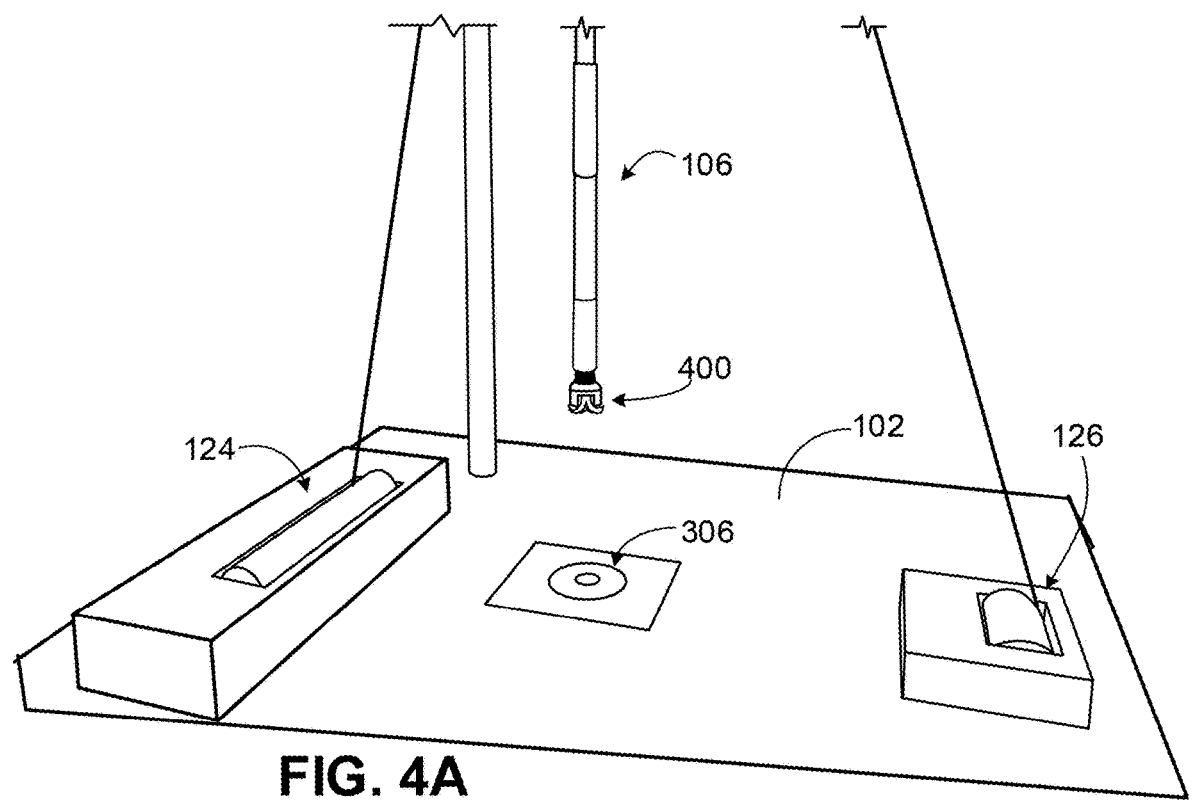
FIG. 4A is a partial schematic perspective view of the example rig system of FIG. 1 with a drill string assembly raised out of hole and including a drill bit.
Figure 4B:
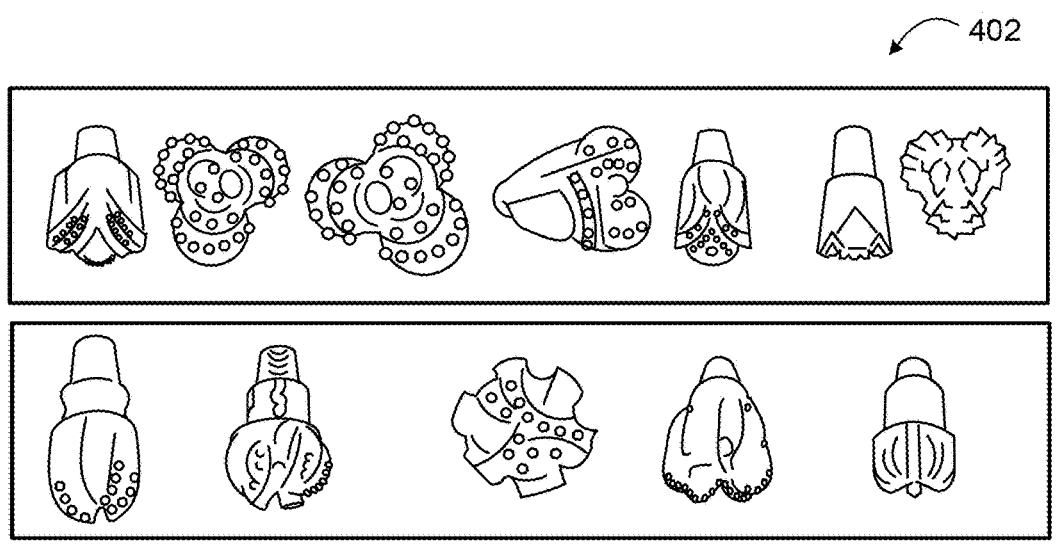
FIG. 4B is a set of multiple views of example drill bits that can be used in the drill bit of FIG. 4A.

FIGS. 3A and 4A are partial schematic perspective views of the example rig system 100 of FIG. 1, except that FIG. 3A shows the drill string assembly 106 as including a separated drill string connection 300 having a pin connector 302 and a box connector 304, and that FIG. 4A shows the drill string assembly 106 as raised out of the hole and exposing the drill bit 400 above the rig floor 102. FIGS. 3B and 3C are close-up views of FIG. 3A, and FIG. 4B is a set of multiple views of example drill bits 402 that can be used in the drill bit of FIG. 4A. Each of FIGS. 3A, 3B, 3C, and 4A also show the rotary table 306 with which the drill string assembly 106 rotates. The monitoring system 200 can be configured to inspect and monitor the example drill string connection (including one or both of the pin connector 302 or the box connector 304) or the example drill bit 400, as described earlier. FIGS. 3A-3C show various angles of the example drill string connection 300, including the pin connector 302 and the box connector 304, which are threaded and configured to engage with each other. In some implementations, FIGS. 3A-3C can represent example views that the image sensor 202 can capture and provide to the gateway 204. The image views can be utilized to perform real-time, continuous image and signal processing and compared with detection/failure/prediction models in artificial intelligence, machine learning databases, as shown in FIGS. 3B and 3C, to extract information and identify anomalies or failures (present and potential) regarding the integrity of the component. In some implementations, the gateway can analyze and determine a failure mode of the component regarding the integrity of the component. The integrity factors can vary, for example, as described here:

Integrity of drill pipes—locating external drill pipe walls for cracks, gouges, dents, pitting, wear, tear, wall thickness losses, corrosion, washouts and outer diameter gauge. The internal drill pipe walls can be checked for imperfections by ultraviolet (UV) cameras for example.

Integrity of drill pipe pin and box connections—cracks, gouges, dents, pitting, wear, tear and corrosion in pin and box threads and in external walls of pins and boxes, pulled and galled threads. The internal pin and box connection walls can also be checked for imperfections and the inner and outer diameter gauges can be measured by ultraviolet (UV) cameras, for example.

Integrity of bottomhole assemblies—cracks, gouges, dents, pitting, wear, tear and corrosion in heavyweight drill pipes and collars, stabilizers, cross-over subs, reamers, drill bit subs and downhole motors.

Integrity of the crown block, travelling block, kelly, top drive, kelly hose and standpipe—cracks, gouges, dents, pitting, wear, tear and corrosion.

Integrity of drilling rig lines—Analysis of tension in the drilling and fast lines and the deadline by monitoring the tension of the drilling lines and the deadline independent of the direction of the travelling block movement and the tension in the fast line. Moreover, cameras can also be utilized to observe drawworks and deadline anchors and make sure the drums and the steel spools are functioning as expected.

Integrity of casing—When steel casing or liner is lowered into a wellbore, then the system can analyze cracks, gouges, dents, pitting, wear, tear and corrosion in casing joints, collars and centralizers.

The image feed from the image sensor 202 can also be utilized to monitor and analyze the make up or break out torque of drillpipe and casing connections, and make predictions on over-torqued threads, keep a real-time downhole inventory of drillpipes, bottom hole assemblies (BHAs), casing joints, collars, and centralizers.

Referring to FIGS. 4A and 4B, the monitoring system 200 can compare the drill bit 400 with the detection/failure/predictive models 402 based on historical data, artificial intelligence, and machine learning models. Also, the monitoring system 200 can analyze the drill bit 400 for failures (present and future), for example, dull characteristics such as erosion, worn or lost teeth or cutters, wash outs, lost nozzles and cones, plugged nozzles or flow by areas, off-center wear, rounded gauges, junk damage, chipped or broken teeth and cutters, cracked or broken cones, bond failures, a combination of these, or other failure modes or deficiencies. The camera angle is not fixed and can be dynamic so that the drill bit can be thoroughly inspected from many angles. The drill bit can also be placed on a dynamically moving structure that allows the camera to inspect can the drill bit from many angles.

As described earlier, the monitoring system 200 can inspect and monitor a number of different components. For example, while FIGS. 3A and 4A show the monitoring system inspecting a drill pipe connection and a drill bit, respectively, the monitoring system 200 can inspect (instead of or in addition to the drill pipe connection or drill bit) a casing tubing, a component of the well head assembly, or another component on the rig. In some implementations, the monitoring system 200 is equipped to handle inspecting one or more or all of the well components on the example rig system 100. The monitoring system 200 can include a database storing information on one or more or all of the well components, for example, to obtain a variety of information on the well components that can be used for predictive maintenance, failure assessment, or other analyses of the well components. The monitoring system can update inspection reports of these components in real-time, and can predict or detect when a component requires maintenance based on the identified operating condition (for example, wear and tear conditions) and expected life of the components and tools. The monitoring system 200 can reduce or eliminate unplanned downtime, extend maintenance cycles, and reduce costs based on this predictive inspection and analysis of the monitoring system 200. In some examples, the monitoring system 200, particularly the gateway 204, can access, generate, provide, display, and otherwise manipulate data on an inspected component regarding cumulative wear and tear, total component downtime, fatigue probability, inspection report highlights, load capacity, last date of maintenance, delivery time to or from a storage warehouse, inventory at a warehouse, classification of class and quality, challenges encountered, well sections drilled, a combination of these data sets, or other data.

Figure 5:
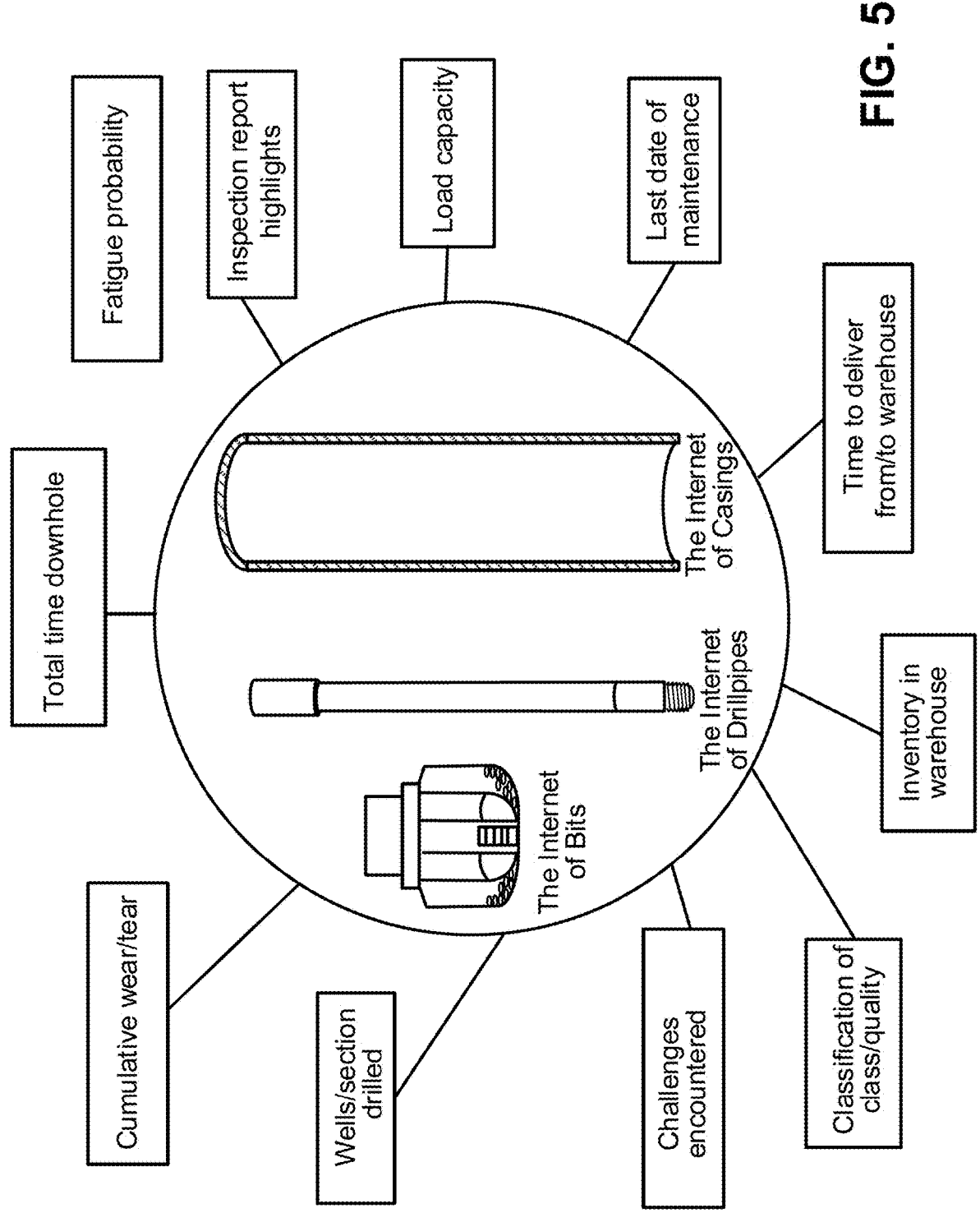
FIG. 5 is a schematic diagram of information on well components that can be accessed and utilized by the monitoring system of FIG. 1.
Figure 6A:
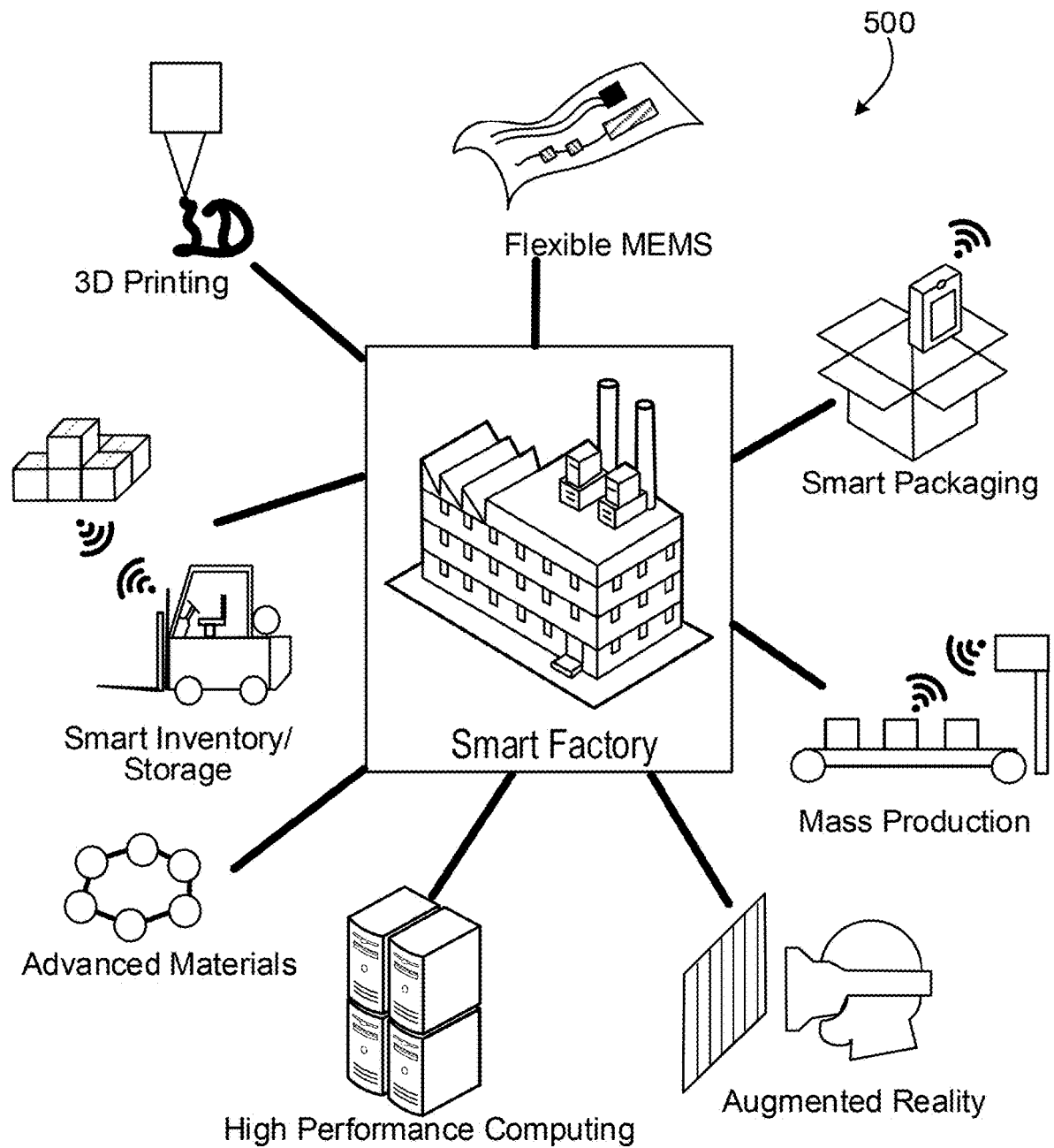
FIG. 6A is a system diagram of an example smart factory.
Figure 6B:
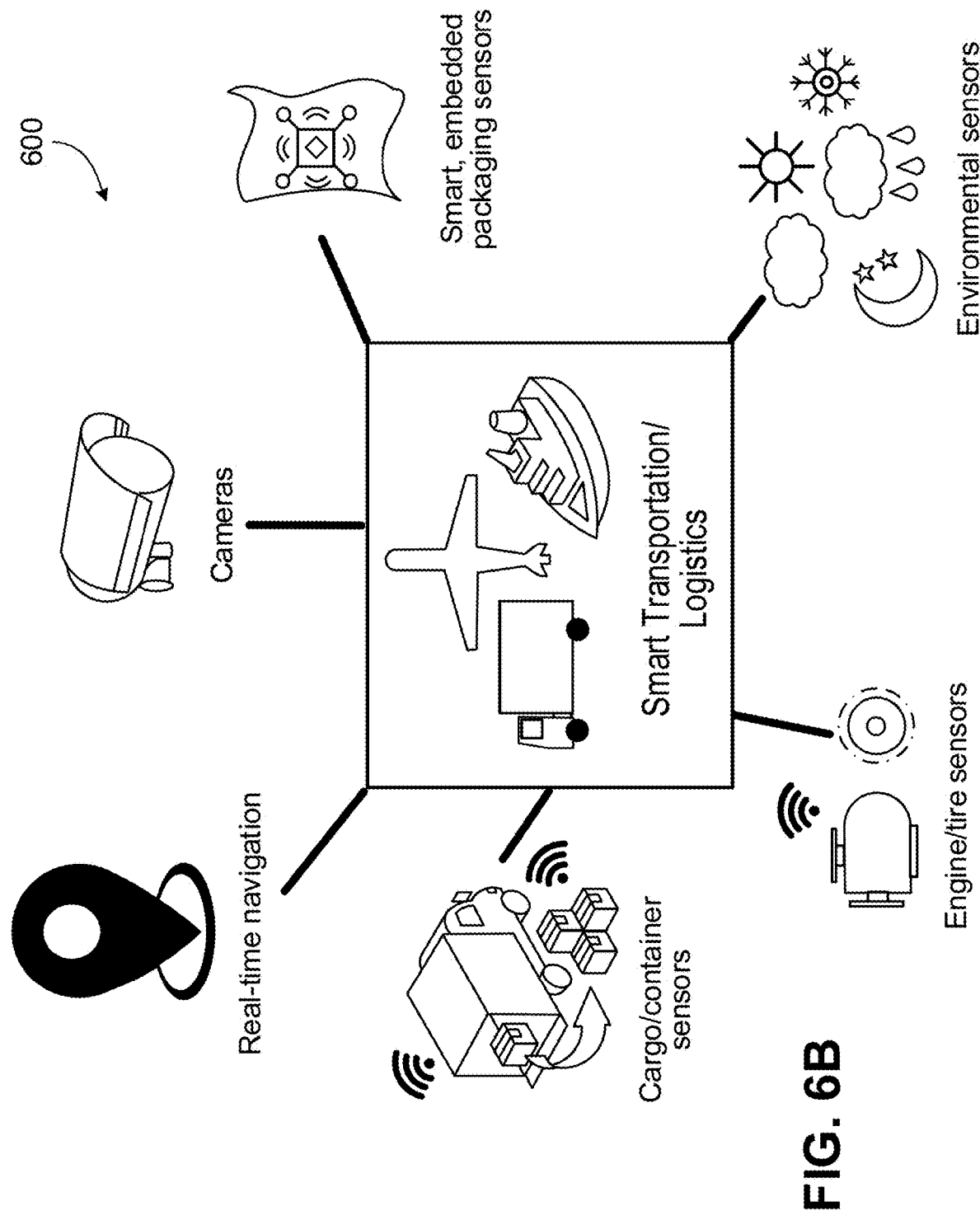
FIG. 6B is a system diagram of an example smart transportation and logistics center.

FIG. 5 is a schematic diagram of information on well components that can be accessed and utilized by the monitoring system 200 of FIG. 1. For example, FIG. 5 shows how information gathered from the operations described earlier with respect to FIGS. 3A-4B can be utilized to build 'Internet of Pipes', 'Internet of Casings', and 'Internet of Bits' models to obtain a variety of information that can be utilized for predictive maintenance of these well components. FIG. 5 shows information particular to bits, drillpipes, and casings, though the information can be applicable to other well components. By updating the inspection reports of these components in real-time, the monitoring system 200 can predict or detect when a component requires maintenance based on the wear and tear conditions and expected life of the component(s). This can aid in reducing or even eliminating unplanned downtime, which betters maintenance cycles and reduces costs. In some implementations, the monitoring system 200 can be extended to perform predictive maintenance on other inventory on rigs, such as motors, generators, engines, pumps, tanks, centrifuges, pipes, valves, or other components, since image sensors 202 such as cameras can be placed easily in several different locations on the rig system 100 and directed at several different equipment, and they can also acquire audio for processing. The monitoring system 200 can be connected across inventory and supply chain management, which includes manufacturing, storage, transportation, and logistics, such that the monitoring system 200 can provide options for and actually act on actively addressing a failure or deficiency of a well component on a rig system in real time. For example, FIGS. 6A and 6B are system diagrams of an example smart factory 500 and an example smart transportation and logistics center 600, respectively. The gateway 204 of the monitoring system 200 can incorporate, connect to, communicate with, or otherwise participate in the exchange of information, data, and instructions in order to streamline smart factory elements and transportation and logistical elements of a smart system. This streamlined exchange of information and intelligence provides for synergy between a rig system (for example, rig system 100), tools and components on the rig system, storage warehouses and factories, and transportation and logistics means.

The smart factory 500 of FIG. 6A can include access to or communication with one or more of 3D printing, micro-electrical-mechanical systems (such as flexible MEMS sensors and instrumentation), smart packaging, smart inventory and storage, mass production, augmented reality, high-performance computing, advanced materials, or other aspects of a smart factory. By incorporating a network of these technologies, a warehouse can become a smart factory that facilitates just-in-time production. Inspection reports from the drilling rig, for example, from the monitoring system 200, can be leveraged with technologies such as 3D printing and advanced materials to fabricate components as needed, to optimize performance, or both. This usage-based design and manufacturing can lead to the design of components that operate within systems and shift product development to an interdisciplinary process. The manufacturing processes can be continuously improved to make the machines and production more efficient given short lead times. Incorporation of new materials, tools, and components can happen at the factory site as scalable short-sprint platforms based on the information fed from the rig system. Performance results from the monitoring system 200 on the rig system 100 can be constantly fed back to the smart factory 500 to help production and to make any modifications to relevant parts, tools, and components to improve their quality, enhance efficiency, and reduce waste.

The smart transportation and logistics center 600 of FIG. 6B can include access to or communication with real-time navigation, cargo and container sensors, engine and tire sensors, environmental sensors, packaging sensors (such as smart, embedded packaging centers), cameras, a combination of these, or other sensors.

Management of a transportation fleet, which includes land, marine, and air transportation, can utilize various technologies to promote the flow of components to and from the rig system 100 and the smart factory 500, and to optimize the smart factory 500. These technologies include real-time navigation, cameras, autonomous vehicle technology, driver behavior analysis, sensors such as temperature, humidity, load, and other characteristics, to monitor container and cargo, and pressure to monitor tire pressure, real-time maintenance reports on usage and condition based on engine sensors and environmental sensors to monitor weather patterns. The rig system 100 and the smart factory 500 can have access to real-time information on the location of tools and components, and any transition time of the tools and components so operations on the rig system 100 and manufacturing processes in the smart factory 500 can be planned and optimized. Moreover, damage or irregularity to the components can be monitored and traced during transport, and can be addressed before the component reaches its intended destination, which can save significant non-productive downtime.

Figure 7A:
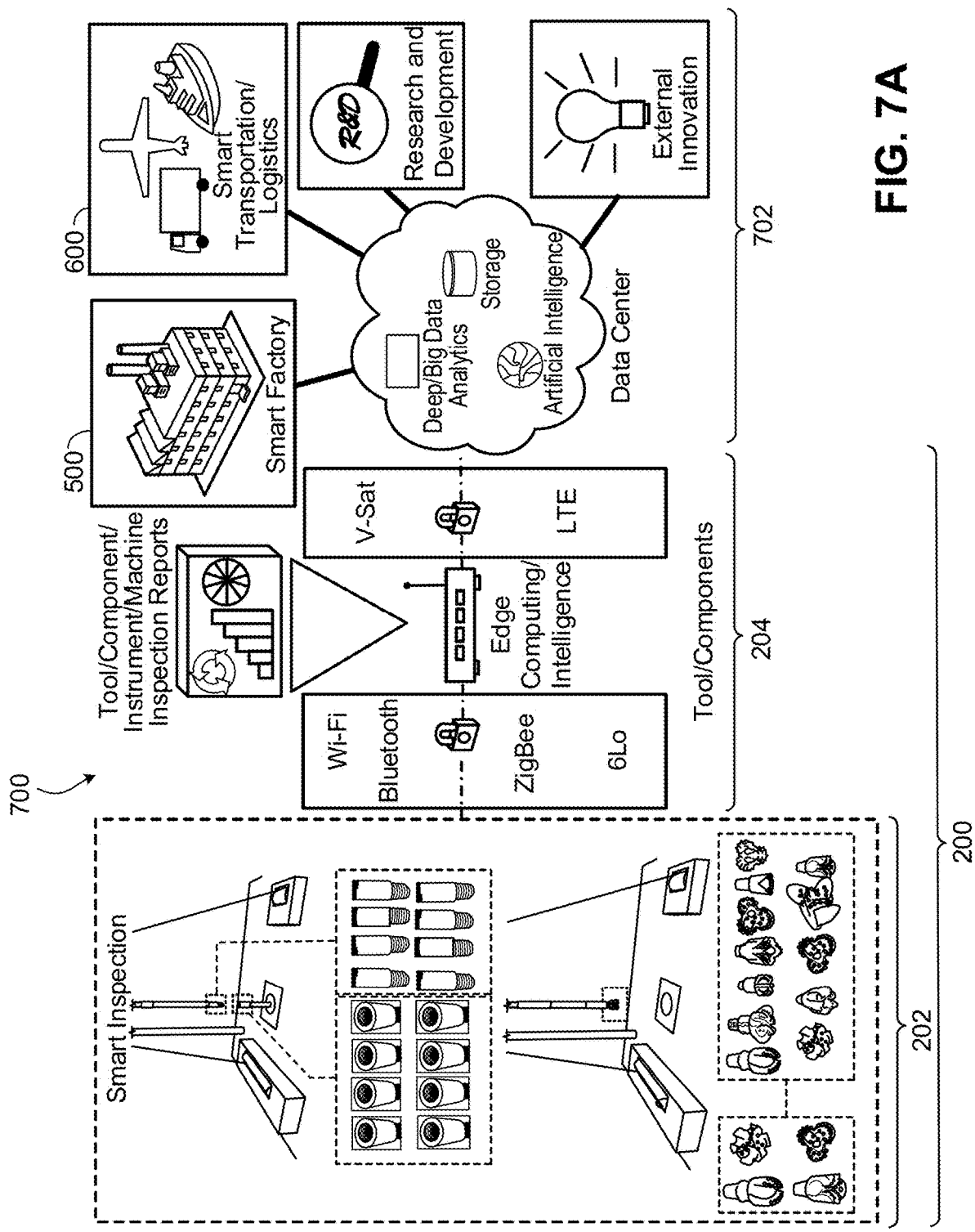
FIG. 7A is an example system diagram of the monitoring system of FIG. 1 communicably coupled to a private cloud.

FIG. 7A is an example system diagram 700 of the monitoring system 200 of FIG. 1 that is communicably coupled to a private cloud 702. The system diagram 700 shows how inspection and predictive maintenance analytics by the monitoring system 200 at the rig system 100 via the image sensor 202 and edge gateway 204 can be transmitted to the private cloud 702. The monitoring system 200 incorporates intelligent cameras and edge/fog computing to perform predictive maintenance of the many tools, components, instruments, or machines on a drilling rig, where the monitoring system 200 improves response time to increase efficiency and boost output, and also improve security on the cloud. For example, the monitoring system 200 performs a substantial majority of the computing and analysis locally, and provides segmented, truncated, or otherwise limited information to the cloud. Standard protocols divided into several layers ensure sensors and devices, gateways, and actuators are able to communicate by sending and receiving data. These layers include transport/session, data, network routing/encapsulating, application, and data link. The risks of having wireless technologies should be identified and antivirus software and firewalls can be used as security measures to protect the data. The raw data acquired by the smart sensor (image sensor 202) is preprocessed, filtered, and reconstructed into useful information by edge/fog computing (gateway 204), which can then be presented in a visual analytics dashboard to an operator of a rig system (rig system 100), which can show specific issues and solution options. The operator can then intervene to manually perform specific tasks, trigger actuators, or let the monitoring system 200 perform an action automatically to solve a problem. The data can then be transmitted by a very small aperture terminal (VSAT) or cellular standard technology such as LTE to the private cloud 702, which acts as the internal corporate central data center. The security, access, and privacy frameworks of the cloud 702 are defined by internal policies and procedures, which can be the same as for the monitoring system 200 at the rig system 100. While edge/fog computing rapidly processes data and performs decision making in real-time, the private cloud 702 can be used to store historical data and also perform large scale deep learning and big data analytics. The smart factory 500 of FIG. 6A and smart transportation/logistics center 600 of FIG. 6B can also be connected to the private cloud 702 with varying security access levels.

Figure 7B:
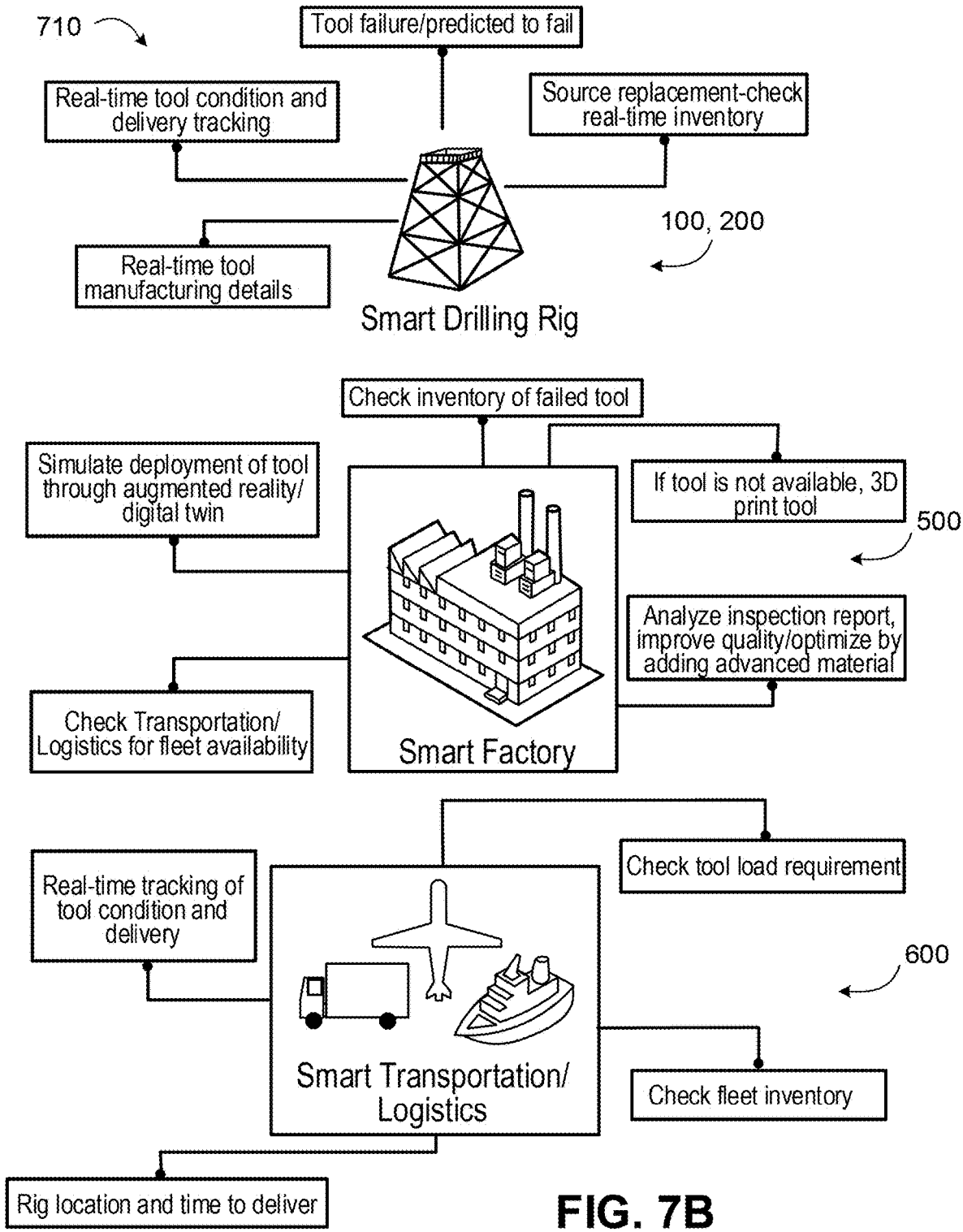
FIG. 7B is an example system diagram showing example scenarios for determining and addressing component failure or predicted component failure of a component of a rig system using a monitoring system, smart factory, and smart transportation and logistics center.

FIG. 7B is an example system diagram 710 showing example scenarios for determining and addressing component failure or predicted component failure of a component of a rig system (for example, rig system 100 of FIG. 1) using a monitoring system, smart factory, and smart transportation and logistics center, for example, the monitoring system 200, smart factory 500, and smart transportation and logistics center 600 of FIGS. 1-9. The system diagram 710 shows options for scenarios of component failure or predicted failure, and how a monitoring system works across the manufacturing/storage and transportation/management value chains to enable enhanced visibility and better control of manufacturing, storage, and transportation/logistics processes as well as increased automation of tasks. For example, when the monitoring system 200 determines that a component is predicted to fail with a certain probability, the monitoring system 200 on the rig system 100 can access the real-time inventory at the smart factory 500. The smart factory 500 can check inventory for the availability of the failed component. If the component is not available, the factory can use technologies such as 3D printing to fabricate the component, and can optimize the fabrication by reviewing the component failure report from the monitoring system 200. Optimization can be performed incorporating technologies such as advanced materials, and the fabricated component can be simulated for utilization in real conditions at the rig system 100 through technologies such as high performance computing and augmented reality. The flow of the processes can be connected in real-time to the rig system 100 so rig personnel can make changes, if needed, to the component being fabricated at any stage of the process. In some examples, rig personnel can request additions to any component, based on real-time inspection reports by the monitoring system 200, at any time according to operations on the rig system 100, and inventory can be automatically updated. Smart transportation and logistics center 600, which can also connect with rig system 100 and the smart factory 500, can check the new component load requirements and check a fleet inventory for the availability of vehicles to transport the component to the rig system 100, and check the location and the time it takes for delivery of the component. A similar calculation can be performed to check the availability of vehicles to pick the failed component from the rig system 100. This information on the component can optimize pick up and delivery of the component, and enable real-time tracking of the component. Such an interconnected system can enable real-time component tracking, remote inventory level monitoring, automatic reporting of inspection and maintenance status of components utilized on the drilling system, or a combination of these. The predictive maintenance performed on the rig system by the monitoring system 200 provides a flexible, adaptable, and smooth flow of operations, as the smart analytics performed by the monitoring system 200 can identify failures before they occur and reduce unplanned downtime on the rig system 100, lower manufacturing, inventory, and transportation/logistics costs, and reduce capital requirements.

Figure 8:
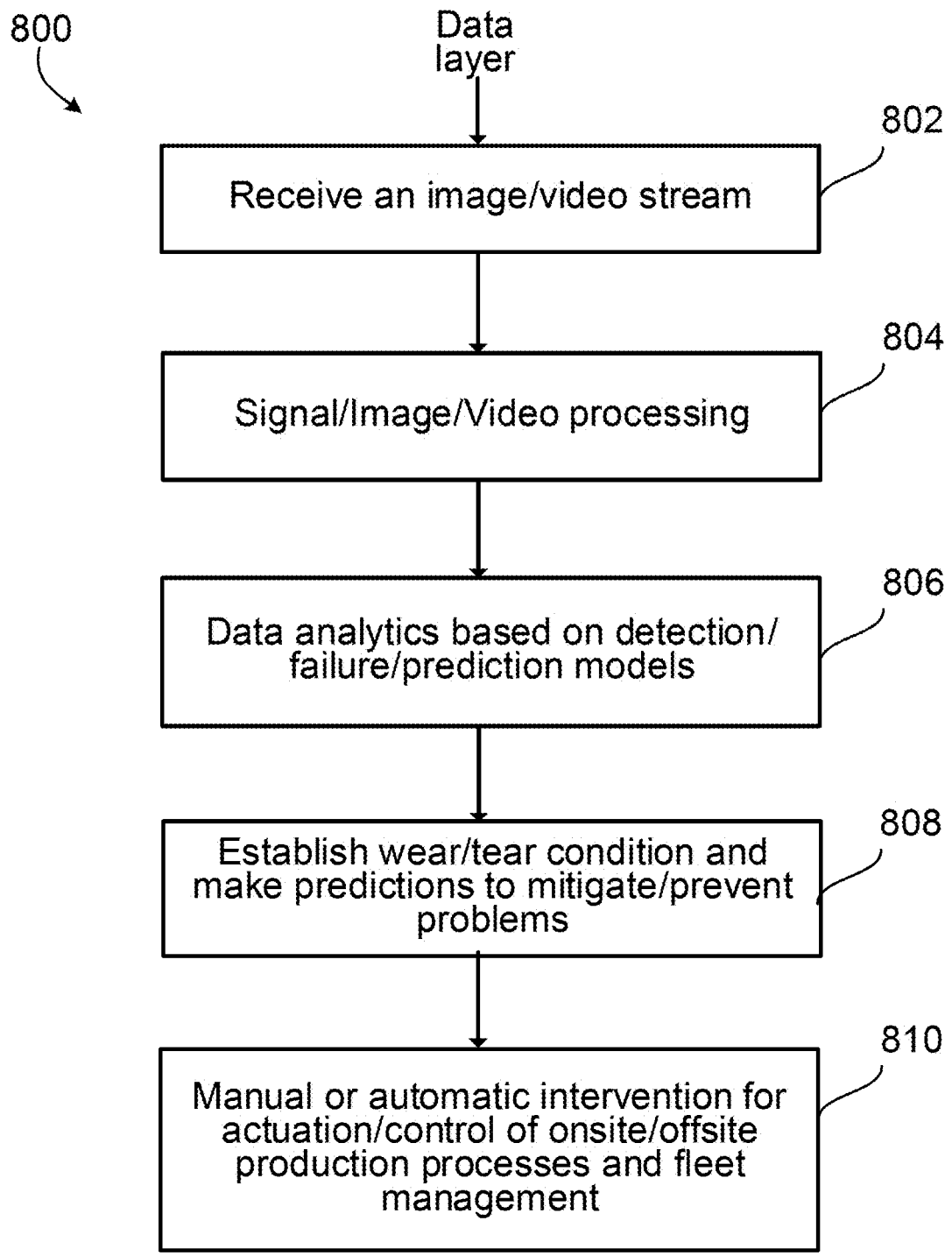
FIG. 8 is a flowchart of an example method for image-based inspection of equipment on drilling rigs.

FIG. 8 is a flowchart of an example method 800 for image-based inspection of equipment on drilling rigs, for example, performed by the example monitoring system 200 on the example rig system 100. For clarity of presentation, the description that follows generally describes method 800 in the context of components in other figures of this description. However, it will be understood that method 800 can be performed, for example, by any suitable system, environment, software, hardware, or a combination of systems, environments, software, and hardware, as appropriate. In some implementations, various steps of method 800 can be run in parallel, in combination, in loops, or in any order.

Starting with a data layer, at step 802, the monitoring system 200 receives an image stream, video stream, or a combination of these of a component on the rig system 100 from the image sensor 202. At step 804, the image/video stream of the well component is processed by the onsite edge gateway 204. At step 806, the monitoring system 200 accesses data analytics based on detection/failure/prediction models accessible by the onsite edge gateway 204. For example, the detection/failure/prediction models can be stored on a private cloud communicably connected to the edge gateway 204, or elsewhere. At step 808, the monitoring system 200 establishes the wear and tear condition of the component and makes a prediction that mitigates or prevents problems with the component. At step 810, the monitoring system 200, particularly the edge gateway 204, instructs a manual or automatic intervention for actuation or control of onsite, offsite, or both onsite and offsite production processes and fleet management.

Figure 9:
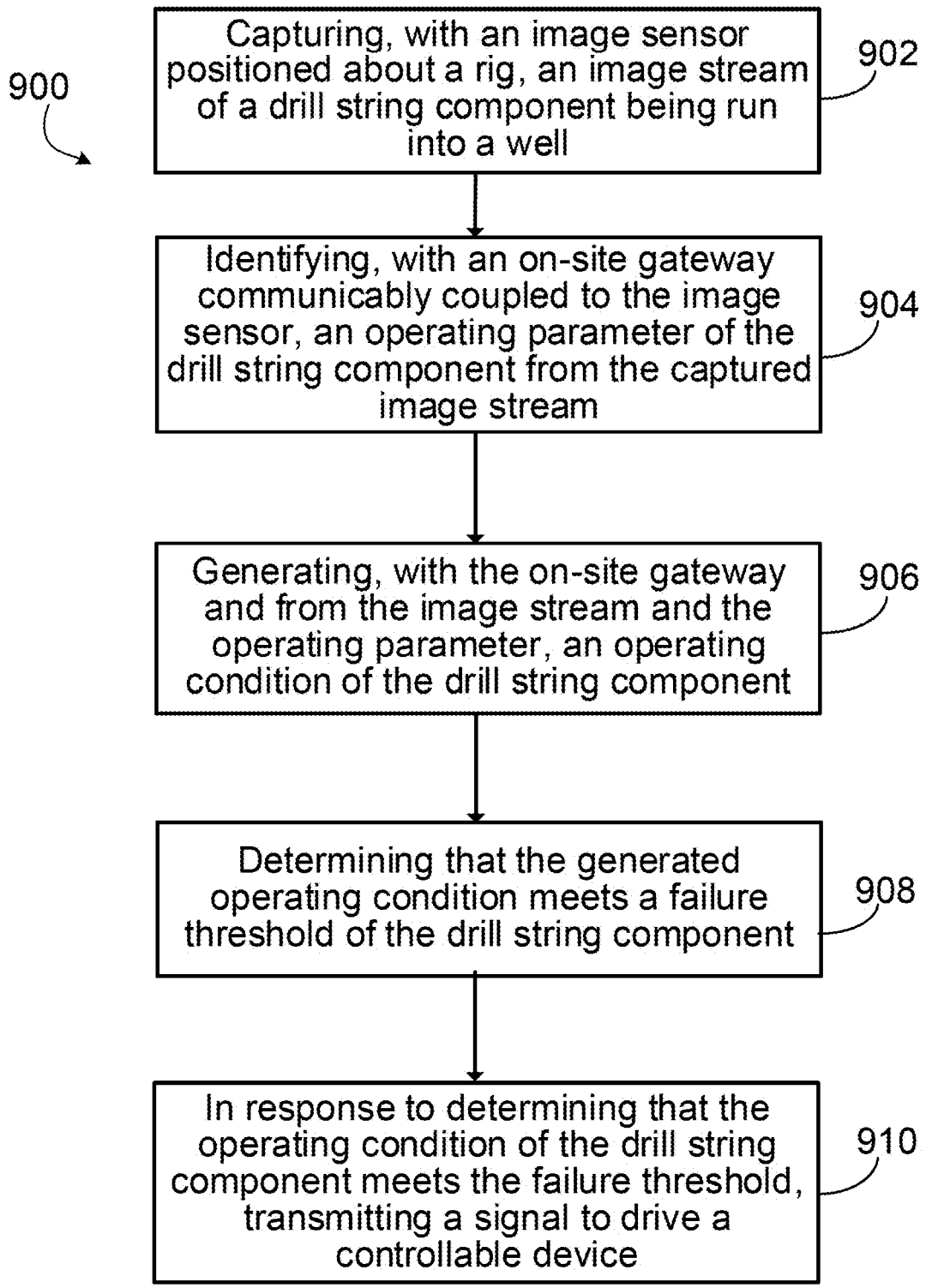
FIG. 9 is a flowchart of an example method for monitoring a rig system.

FIG. 9 is a flowchart of an example method 900 for monitoring a rig system, for example, performed by the example monitoring system 200 on the example rig system 100. For clarity of presentation, the description that follows generally describes method 900 in the context of the other figures in this description. However, it will be understood that method 900 can be performed, for example, by any suitable system, environment, software, hardware, or a combination of systems, environments, software, and hardware, as appropriate. In some implementations, various steps of method 900 can be run in parallel, in combination, in loops, or in any order.

At step 902, an image sensor positioned about a rig captures an image stream of a component of a drill string being run into a well. The drill string component can include a drill pipe, a drill bit, a tool joint, a casing tubing, or another component on a rig system. The rig system can include more than one image sensor to capture an image stream of the component.

At step 904, an on-site edge gateway communicably coupled to the image sensor identifies an operating parameter of the drill string component from the captured image stream. The operating parameter can include an integrity of the drill string component. At step 906, the on-site edge gateway generates, from the image stream and the operating parameter, an operating condition of the drill string component. The operating condition of the component can include the determination of a failure type of a feature of the drill string component, where the failure type includes a crack, gouge, dent, pitting, wear, tear, corrosion, a combination of these, or another failure type of the feature of the drill string component.

At step 908, the on-site edge gateway determines that the generated operating condition meets a failure threshold of the drill string component. At step 910, in response to determining that the operating condition of the drill string component meets the failure threshold, the on-site edge gateway transmits a signal to drive a controllable device. The controllable device can include a user interface for a rig operator to interact with, and the gateway can display an inspection report or other related information of the drill string component on the user interface. In some implementations, transmitting a signal to drive a controllable device includes prompting an order of a replacement part for the drill string component. In some instances, the controllable device includes a printer, and the gateway 204 can prompt the printer to manufacture a replacement part for the drill string component.

Figure 10:
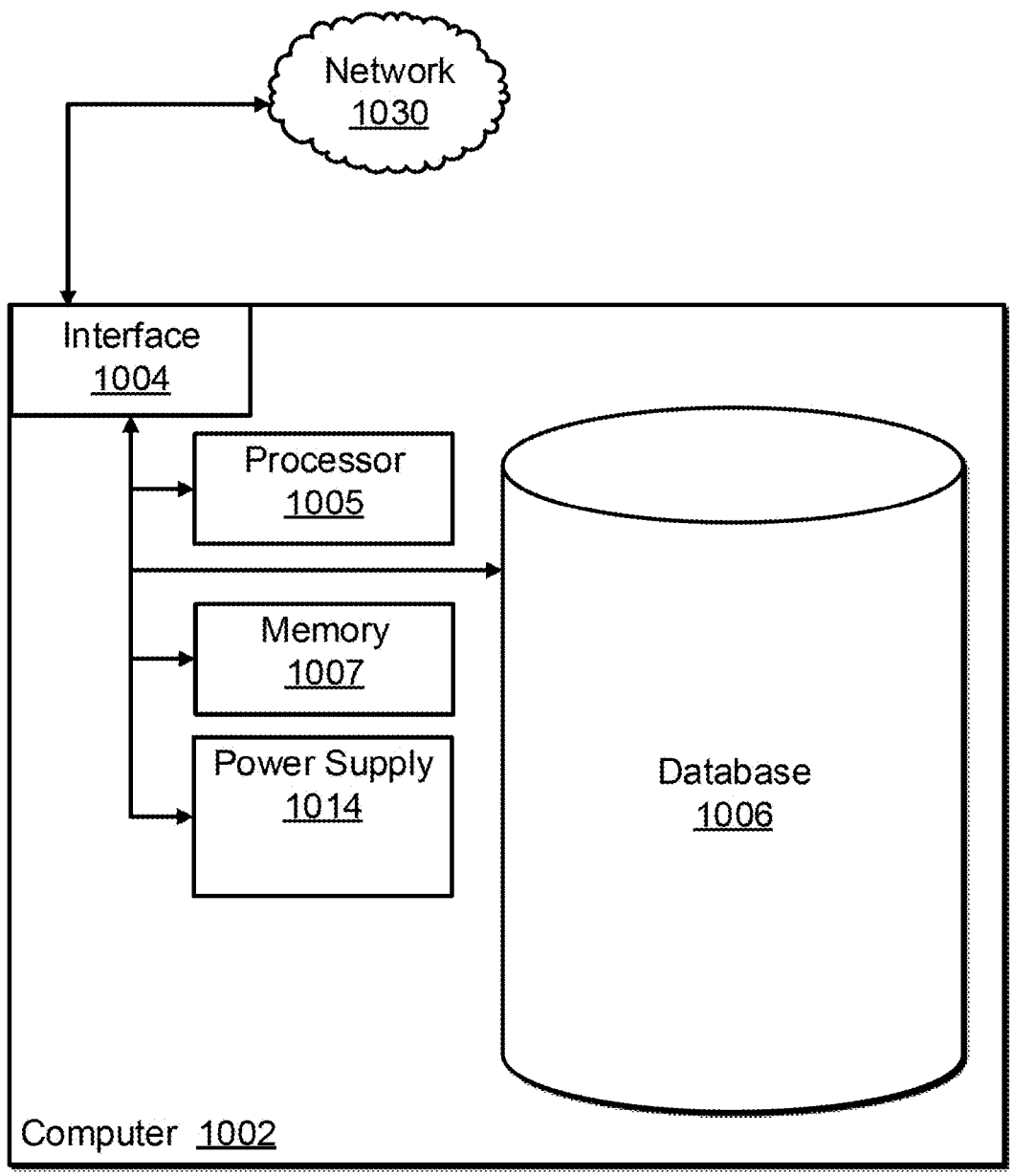
FIG. 10 is a block diagram illustrating the example onsite gateway of the monitoring system of FIG. 1.

FIG. 10 is a block diagram of an example computer system 1000 that can be used to provide computational functionalities associated with described algorithms, methods, functions, processes, flows, and procedures described in the present disclosure, according to some implementations of the present disclosure. In some implementations, the on-site edge gateway 204 can be the computer system 1000, include the computer system 1000, or include part of the computer system 1000, for example, the portion of the computer system 1000 that can be located locally on a rig system for edge/fog computing. In some implementations, the onsite edge gateway 204 can communicate with the computer system 1000.

The illustrated computer 1002 is intended to encompass any computing device such as a server, a desktop computer, embedded computer, a laptop/notebook computer, a wireless data port, a smart phone, a personal data assistant (PDA), a tablet computing device, or one or more processors within these devices, including physical instances, virtual instances, or both. The computer 1002 can include input devices such as keypads, keyboards, and touch screens that can accept user information. Also, the computer 1002 can include output devices that can convey information associated with the operation of the computer 1002. The information can include digital data, visual data, audio information, or a combination of information. The information can be presented in a graphical user interface (UI) (or GUI). In some implementations, the inputs and outputs include display ports (such as DVI-I+2x display ports), USB 3.0, GbE ports, isolated DI/O, SATA-III (6.0 Gb/s) ports, mPCIe slots, a combination of these, or other ports. In instances of an edge gateway, the computer 1002 can include a Smart Embedded Management Agent (SEMA), such as a built-in ADLINK SEMA 2.2, and a video sync technology, such as Quick Sync Video technology supported by ADLINK MSDK+. In some examples, the computer 1002 can include the MXE-5400 Series processor-based fanless embedded computer by ADLINK, though the computer 1002 can take other forms or include other components.

The computer 1002 can serve in a role as a client, a network component, a server, a database, a persistency, or components of a computer system for performing the subject matter described in the present disclosure. The illustrated computer 1002 is communicably coupled with a network 1030. In some implementations, one or more components of the computer 1002 can be configured to operate within different environments, including cloud-computing-based environments, local environments, global environments, and combinations of environments.

At a high level, the computer 1002 is an electronic computing device operable to receive, transmit, process, store, and manage data and information associated with the described subject matter. According to some implementations, the computer 1002 can also include, or be communicably coupled with, an application server, an email server, a web server, a caching server, a streaming data server, or a combination of servers.

The computer 1002 can receive requests over network 1030 from a client application (for example, executing on another computer 1002). The computer 1002 can respond to the received requests by processing the received requests using software applications. Requests can also be sent to the computer 1002 from internal users (for example, from a command console), external (or third) parties, automated applications, entities, individuals, systems, and computers.

Each of the components of the computer 1002 can communicate using a system bus. In some implementations, any or all of the components of the computer 1002, including hardware or software components, can interface with each other or the interface 1004 (or a combination of both), over the system bus. Interfaces can use an application programming interface (API), a service layer, or a combination of the API and service layer. The API can include specifications for routines, data structures, and object classes. The API can be either computer-language independent or dependent. The API can refer to a complete interface, a single function, or a set of APIs.

The service layer can provide software services to the computer 1002 and other components (whether illustrated or not) that are communicably coupled to the computer 1002. The functionality of the computer 1002 can be accessible for all service consumers using this service layer. Software services, such as those provided by the service layer, can provide reusable, defined functionalities through a defined interface. For example, the interface can be software written in JAVA, C++, or a language providing data in extensible markup language (XML) format. While illustrated as an integrated component of the computer 1002, in alternative implementations, the API or the service layer can be stand-alone components in relation to other components of the computer 1002 and other components communicably coupled to the computer 1002. Moreover, any or all parts of the API or the service layer can be implemented as child or sub-modules of another software module, enterprise application, or hardware module without departing from the scope of the present disclosure.

The computer 1002 can include an interface 1004. Although illustrated as a single interface 1004 in FIG. 10, two or more interfaces 1004 can be used according to particular needs, desires, or particular implementations of the computer 1002 and the described functionality. The interface 1004 can be used by the computer 1002 for communicating with other systems that are connected to the network 1030 (whether illustrated or not) in a distributed environment. Generally, the interface 1004 can include, or be implemented using, logic encoded in software or hardware (or a combination of software and hardware) operable to communicate with the network 1030. More specifically, the interface 1004 can include software supporting one or more communication protocols associated with communications. As such, the network 1030 or the interface's hardware can be operable to communicate physical signals within and outside of the illustrated computer 1002.

The computer 1002 includes a processor 1005. Although illustrated as a single processor 1005 in FIG. 10, two or more processors 1005 can be used according to particular needs, desires, or particular implementations of the computer 1002 and the described functionality. Generally, the processor 1005 can execute instructions and can manipulate data to perform the operations of the computer 1002, including operations using algorithms, methods, functions, processes, flows, and procedures as described in the present disclosure.

The computer 1002 can also include a database 1006 that can hold data for the computer 1002 and other components connected to the network 1030 (whether illustrated or not). For example, database 1006 can be an in-memory, conventional, or a database storing data consistent with the present disclosure. In some implementations, database 1006 can be a combination of two or more different database types (for example, hybrid in-memory and conventional databases) according to particular needs, desires, or particular implementations of the computer 1002 and the described functionality. Although illustrated as a single database 1006 in FIG. 10, two or more databases (of the same, different, or combination of types) can be used according to particular needs, desires, or particular implementations of the computer 1002 and the described functionality. While database 1006 is illustrated as an internal component of the computer 1002, in alternative implementations, database 1006 can be external to the computer 1002.

The computer 1002 also includes a memory 1007 that can hold data for the computer 1002 or a combination of components connected to the network 1030 (whether illustrated or not). Memory 1007 can store any data consistent with the present disclosure. In some implementations, memory 1007 can be a combination of two or more different types of memory (for example, a combination of semiconductor and magnetic storage) according to particular needs, desires, or particular implementations of the computer 1002 and the described functionality. Although illustrated as a single memory 1007 in FIG. 10, two or more memories 1007 (of the same, different, or combination of types) can be used according to particular needs, desires, or particular implementations of the computer 1002 and the described functionality. While memory 1007 is illustrated as an internal component of the computer 1002, in alternative implementations, memory 1007 can be external to the computer 1002.

An application can be an algorithmic software engine providing functionality according to particular needs, desires, or particular implementations of the computer 1002 and the described functionality. For example, an application can serve as one or more components, modules, or applications. Multiple applications can be implemented on the computer 1002. Each application can be internal or external to the computer 1002.

The computer 1002 can also include a power supply 1014. The power supply 1014 can include a rechargeable or non-rechargeable battery that can be configured to be either user- or non-user-replaceable. In some implementations, the power supply 1014 can include power-conversion and management circuits, including recharging, standby, and power management functionalities. In some implementations, the power-supply 1014 can include a power plug to allow the computer 1002 to be plugged into a wall socket or a power source to, for example, power the computer 1002 or recharge a rechargeable battery.

There can be any number of computers 1002 associated with, or external to, a computer system including computer 1002, with each computer 1002 communicating over network 1030. Further, the terms "client," "user," and other appropriate terminology can be used interchangeably, as appropriate, without departing from the scope of the present disclosure. Moreover, the present disclosure contemplates that many users can use one computer 1002 and one user can use multiple computers 1002.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A system, comprising:
    an image sensor positioned about a rig, the image sensor directed at a drill string component positioned on the rig; and
    an onsite gateway communicably coupled to the image sensor and disposed proximate to the rig, the onsite gateway comprising:
        one or more processors; and
        a non-transitory computer-readable storage medium coupled to the one or more processors and storing programming instructions for execution by the one or more processors, the programming instructions instruct the one or more processors to:
            receive an image stream of the drill string component from the image sensor;
            identify, from the image stream, an operating parameter of the drill string component, wherein the operating parameter comprises an integrity of the drill string component, and identifying the operating parameter comprises analyzing the integrity of the drill string component;
            generate, from the image stream and the identified operating parameter, an operating condition of the drill string component, wherein generating the operating condition comprises determining a failure type of a feature of the drill string component, the failure type comprising at least one of a crack, gouge, dent, pitting, wear, tear, or corrosion of the feature of the drill string component;
            store the generated operating condition of the drill string component within a historical data on a cloud communicably connected to the onsite gateway, the cloud configured to store and analyze the historical data of operating conditions;
            determine, based on the generated operating condition and the stored historical data of operating conditions on the cloud, that the generated operating condition meets a failure threshold of the drill string component; and
            responsive to determining that the generated operating condition meets a failure threshold of the drill string component, send an instruction to drive a controllable device, wherein sending instruction to drive a controllable device comprises automatically prompting a retrieval of a replacement part of the drill string component from a fabrication factory and a transportation of the replacement part of the drill string component to the rig.

2. The system of claim 1, where the image sensor comprises a high-definition camera.

3. The system of claim 1, where the image sensor is one of a plurality of image sensors positioned about the rig.

4. The system of claim 3, where the plurality of image sensors are at least partially directed at a drill string of the rig, the drill string comprising the drill string component.

5. The system of claim 1, where the image sensor comprises an audio sensor configured to provide an audio stream to the onsite gateway.

6. The system of claim 1, where the controllable device comprises a user interface, and sending an instruction to drive the controllable device comprises displaying an inspection report of the drill string component on the user interface.

7. The system of claim 1, where the controllable device comprises a printer, and automatically prompting a retrieval or fabrication of a replacement part of the drill string component at a fabrication factory further comprises sending an instruction to drive the printer to manufacture the replacement part of the drill string component.

8. The system of claim 1, where the drill string component comprises at least one of a drill pipe, a drill bit, a tool joint, or a casing.

9. A method, comprising:
    capturing, with an image sensor positioned about a rig, an image stream of a drill string component being run into a well;
    identifying, with an on-site gateway communicably coupled to the image sensor, an operating parameter of the drill string component from the captured image stream, wherein the operating parameter comprises an integrity of the drill string component, and identifying the operating parameter comprises analyzing the integrity of the drill string component;
    generating, with the on-site gateway and from the image stream and the operating parameter, an operating condition of the drill string component, wherein generating the operating condition comprises determining a failure type of a feature of the drill string component, the failure type comprising at least one of a crack, gouge, dent, pitting, wear, tear, or corrosion of the drill string component;
    storing the generated operating condition of the drill string component within a historical data of operating conditions on a cloud communicably connected to the on-site gateway, the cloud configured to store and analyze historical data of operating conditions;
    determining, based on the generated operating condition and the stored historical data of operating conditions on the cloud, that the generated operating condition meets a failure threshold of the drill string component; and in response to determining that the operating condition of the drill string component meets the failure threshold, transmitting a signal to drive a controllable device, wherein transmitting a signal to drive a controllable device comprises automatically prompting a retrieval of a replacement part of the drill string component from a fabrication factory and a transportation of the replacement part of the drill string component to the rig.

10. The method of claim 9, where the controllable device comprises a user interface, and transmitting a signal to drive a controllable device comprises displaying an inspection report of the drill string component on the user interface.

11. The method of claim 9, where the controllable device comprises a printer, and transmitting a signal to drive a controllable device further comprises prompting the printer to manufacture the replacement part for the drill string component.

12. The method of claim 9, where the drill string component comprises at least one of a drill pipe, a drill bit, a tool joint, or a casing.

13. The method of claim 9, where capturing an image stream of a drill string component comprises capturing, with a plurality of image sensors comprising the image sensor, the image stream of the drill string component.

14. The method of claim 9, where identifying an operating parameter of the drill string component from the captured image stream comprises filtering the image stream using at least one of spatial domain or frequency domain filtering.

15. A system, comprising:
  an image sensor positioned about a rig, the image sensor directed at a drill string component of a well tool positioned on the rig; and
  an onsite gateway communicably coupled to the image sensor and disposed proximate to the rig, the onsite gateway comprising:
    one or more processors; and
    a non-transitory computer-readable storage medium coupled to the one or more processors and storing programming instructions for execution by the one or more processors, the programming instructions instruct the one or more processors to:
    receive an image stream of the drill string component from the image sensor;
    identify, from the image stream, an operating parameter of the drill string component, wherein the operating parameter comprises an integrity of the drill string component, and identifying the operating parameter comprises analyzing the integrity of the drill string component;
    generate, from the image stream and the identified operating parameter, an operating condition of the drill string component, wherein generating the operating condition comprises determining a failure type of a feature of the drill string component, the failure type comprising at least one of a crack, gouge, dent, pitting, wear, tear, or corrosion of the drill string component;
    store the generated operating condition of the drill string component within a historical data on a cloud communicably connected to the onsite gateway, the cloud configured to store and analyze the historical data of operating conditions;
    determine, based on the generated operating condition and the stored historical data of operating conditions on the cloud, that an automation rule includes the operating condition generated from the image stream; and
    responsive to determining that an automation rule includes the operating condition, send an instruction to drive a maintenance robot to perform maintenance on the drill string component or to remove and replace the drill string component with a replacement drill string component.

16. The method of claim 9, further comprising performing at least one of deep learning algorithms, machine learning algorithms, artificial intelligence algorithms, or big data analytics on the historical data stored on the cloud to generate an optimization parameter from the historical data; and
  wherein determining that the generated operating condition meets a failure threshold of the drill string component comprises determining, based on the optimization parameter from the historical data on the cloud, that the generated operating condition meets the failure threshold.

17. The method of claim 9, wherein analyzing the integrity of the drill string component comprises analyzing the image stream using at least one of analog signal processing, digital signal processing, pattern recognition, edge detection, wavelet transform processing, pixelated processing, image texture processing, component-based approach connectivity processing, principle component analysis, independent component analysis, descriptors based methods, linear filtering, anisotropic diffusion operations, grey-level segmentation, or image thresholding.

18. The method of claim 9, wherein storing the generated operating condition of the drill string component within the historical data of operating conditions on the cloud comprises generating a dataset of the drill string component on the cloud.

* * * * *